United States Patent [19]

Moulding et al.

[11] Patent Number: 5,344,043

[45] Date of Patent: Sep. 6, 1994

[54] DISPENSER ESPECIALLY ADAPTED FOR DISPENSING MEDICATION UNITS

[75] Inventors: Thomas S. Moulding, 214 Via La Soledad, Redondo Beach, Calif. 90277; Donald G. Ellis, Boulder, Colo.

[73] Assignee: Thomas S. Moulding, Redondo Beach, Calif.

[21] Appl. No.: 60,829

[22] Filed: May 10, 1993

Related U.S. Application Data

[60] Continuation-in-part of Ser. No. 878,169, May 4, 1992, Pat. No. 5,219,093, which is a division of Ser. No. 414,454, Sep. 29, 1989, Pat. No. 5,110,008.

[51] Int. Cl.⁵ .............................................. B65H 5/28
[52] U.S. Cl. .................................... 221/71; 221/233; 242/538.3; 242/540
[58] Field of Search .................. 221/71, 72, 70, 69, 221/77, 82, 84, 78, 76, 74, 259, 196, 233, 25, 30, 31, 131, 7, 2, 13, 9, 15, 258, 287; 242/75.4, 67.3 R, 107.1, 107, 107.13, 107.15

[56] References Cited

U.S. PATENT DOCUMENTS

| | | | |
|---|---|---|---|
| 479,688 | 7/1892 | Weller | 194/286 |
| 877,232 | 1/1908 | Rolland, Jr. | 242/75.4 |
| 1,183,848 | 5/1916 | Bowman | 221/71 |
| 1,452,721 | 4/1923 | Antoine | 154/226 |
| 2,167,049 | 7/1939 | Maurath et al. | 198/43 |
| 2,375,459 | 5/1945 | Ballou | 242/75.4 |
| 2,408,686 | 10/1946 | Rush | 10/5 |
| 2,587,928 | 3/1952 | Tuck et al. | 221/25 |
| 2,630,245 | 3/1953 | Maier | 222/10 |
| 2,923,436 | 2/1960 | Koehn | 221/265 |
| 3,063,596 | 11/1962 | D'Autheville et al. | 221/7 |
| 3,065,879 | 11/1962 | Jennings et al. | 221/233 |
| 3,105,609 | 10/1963 | Salisberg | 221/176 |
| 3,215,310 | 11/1965 | Hurst et al. | 221/7 |
| 3,241,712 | 3/1966 | Sacchetti et al. | 221/265 |
| 3,323,747 | 6/1967 | Schmidt | 242/75.4 |
| 3,392,881 | 7/1968 | Eriksen | 221/213 |

(List continued on next page.)

FOREIGN PATENT DOCUMENTS

| | | |
|---|---|---|
| 1916304 | 3/1969 | Fed. Rep. of Germany . |
| 1171839 | 4/1957 | France . |
| 253231 | 3/1928 | Italy . |
| 189285 | 12/1960 | Sweden . |
| 1411952 | 9/1972 | United Kingdom . |

OTHER PUBLICATIONS

Pharmacology and Therapeutics; The unrealized potential of the medication monitor; Feb. 1979, vol. 25, No. 2.
Possible Designs of Medication Monitors; National Technical Information Service PB-278973 Apr. 1978.

*Primary Examiner*—Kenneth W. Noland

[57] ABSTRACT

A dispenser for medication units such as pills, tablets, caplets, and capsules which allows dispensing of a single medication unit upon the simple push of a button or verbal request includes a control system which allows convenient changes, optionally responsive to instructions from a physician or other medical personnel via a modem over telephone lines, in the frequency and dosage of one medication in a regimen, without altering the schedule for other medications. The dispenser includes at least one elongated plastic band possessing at least one facing surface covered by a compressible material, such as elastomer foam, cloth, or brush bristles, having medication units sandwiched between the layers of the band or bands wound in abutting overlying relation on a storage reel. In order to dispense the medication units, rotating mechanisms unwind the band or bands from the storage reel onto separate take-up reel or reels, causing the dispensed medication units to fall and interrupt a light beam detector. Rotating mechanisms for the take-up reel or reels may comprise manual hand cranks, clock springs, or electric motors. A control system includes a CPU, memory, a timer, a modem, and an activation signal input device for regulating the amount, time, and frequency of administration, and for allowing changes in the medication regimen. A plurality of storage reels with associated take-up reels combined in a single dispenser allows dispensing of various different medications at different dosages and intervals depending upon the requirements of a particular medication regimen.

95 Claims, 15 Drawing Sheets

U.S. PATENT DOCUMENTS

| | | | |
|---|---|---|---|
| 3,410,450 | 11/1968 | Fortenbury | 221/71 |
| 3,860,111 | 1/1975 | Thompson | 206/534 |
| 3,991,908 | 11/1976 | Thomas et al. | 221/154 |
| 4,018,358 | 4/1977 | Johnson et al. | 221/7 |
| 4,023,706 | 5/1977 | Dearlove et al. | 221/72 |
| 4,128,188 | 12/1978 | White | 221/91 |
| 4,163,507 | 7/1979 | Bell | 221/2 |
| 4,273,254 | 6/1981 | Cuppleditch et al. | 221/196 |
| 4,274,550 | 6/1981 | Feldstein | 221/71 |
| 4,460,106 | 7/1984 | Moulding, Jr. et al. | 221/1 |
| 4,523,694 | 6/1985 | Veltri | 221/265 |
| 4,573,606 | 3/1986 | Lewis et al. | 221/2 |
| 4,648,529 | 3/1987 | Blakemore et al. | 221/1 |
| 4,733,797 | 3/1988 | Haber | 221/8 |
| 4,748,600 | 5/1988 | Urguhart | 221/15 |
| 4,763,810 | 8/1988 | Christiansen | 221/3 |
| 4,787,569 | 11/1988 | Kanada et al. | 242/107 |
| 4,869,392 | 9/1989 | Moulding, Jr. et al. | 221/15 |
| 5,065,894 | 11/1991 | Garland | 221/71 |
| 5,097,982 | 3/1992 | Kedem et al. | 221/15 |
| 5,102,008 | 4/1992 | Kaufman et al. | 221/25 |
| 5,110,008 | 5/1992 | Moulding, Jr. et al. | 221/259 |

DISPENSER ESPECIALLY ADAPTED FOR DISPENSING MEDICATION UNITS

CROSS-REFERENCE TO RELATED APPLICATIONS

This application is a continuation-in-part of U.S. patent application Ser. No. 07/878,169 filed May 4, 1992 and now U.S. Pat. No. 5,219,093; which is a division of U.S. patent application Ser. No. 07/414,454 filed Sep. 29, 1989 and now U.S. Pat. No. 5,110,008; the entire disclosures of all of which are hereby incorporated herein by reference.

BACKGROUND OF THE INVENTION

1. Field Of The Invention

The present invention relates to dispensers, and more particularly pertains to an improved dispenser especially adapted for dispensing medication units such as pills, tablets, caplets, and capsules which allows control and recording of the type and quantity of medication dispensed, as well as the time of dispensing. As described in detail in the background section of U.S. Pat. No. 5,110,008, there is a serious need for dispensers to aid and control the ingestion of medication by outpatients. In particular, arthritic, poorly coordinated, and neurologically disabled individuals experience great difficulty in carrying out even the relatively simple manipulations required to conform to a prescribed medication regimen. Such patients require a device capable of dispensing medications units such as pills, tablets, caplets, or capsules upon a simple act such as the push of a button or issuance of a verbal command.

2. Description Of The Prior Art

One prior art attempt to address the aforementioned problems, described in U.S. Pat. No. 4,763,810, entails the provision of a dispenser possessing multiple compartments each designed to contain appropriate dosages of various different medications prescribed for administration to a particular patient on a single occasion. This dispenser does not readily adapt to changes in a patient's medication regimen due to the requirement that each compartment be initially filled with the desired dosages of all different medications to be taken on each administration occasion. Thus, if a doctor wishes to change the medication regimen by stopping a particular medication, changing the dosage of one or more medications, or starting a new medication, all of the compartments must be emptied and refilled in accordance with the new regimen. Such changes in medication regimens may occur frequently, dependent upon the different individual responses of various patients to particular medications and medication combinations. The requirement for repacking of the individual compartments of the dispenser by a responsible family member or pharmacy personnel places a hindrance on the ability of the patient to receive the prescribed medication.

Frequently, patients will forget to take their prescribed medication at a particular time. In order to compensate for missed dosages, the next dosage of some medications should be doubled in order to "catch up". Other medications must not be double dosed to make up for such skipped administrations. The provision of various diverse medications in a single compartment of a dispenser substantially hinders proper selective administration of double make-up doses, dependent upon the particular medication.

SUMMARY OF THE INVENTION

In order to overcome the disadvantages of prior art dispensers described above, the present invention provides an improved dispenser especially adapted for dispensing medication units such as pills, tablets, caplets, and capsules of various differing shapes and sizes which allows dispensing of a single medication unit separate from other medication units upon the simple push of a button or verbal request. A control system allows convenient changes, optionally responsive to instructions from a physician or other medical personnel via a modem over telephone lines, in the frequency and dosage of one medication in a regimen, without altering the schedule for other medications. In a preferred embodiment, the dispenser of the present invention includes a pair of elongated plastic bands possessing facing surfaces covered by a compressible material such as elastomer foam, having medication units sandwiched therebetween and wound in abutting overlying relation on a storage reel. In order to dispense the medication units from between the bands, rotating mechanisms unwind the bands from the storage reel onto separate take-up reels, causing the dispensed medication units to fall and be sensed by a detector. Rotating mechanisms for the take-up reels may comprise manual hand cranks, springs, or electric motors. The device may also include a brake on the storage reel to control the amount of medication dispensed. If a hand crank is used, the device may include a clutch to control how much medication is dispensed.

A control system includes a central processing unit (CPU), memory, timer, and an activating signal input device such as a push button or voice activation circuit for regulating the amount, time, and frequency of administration. The control circuit also allows changes in the medication regimen. Instructions for such changes may be transmitted over a telephone line using a telephone modem. A dispenser according to one embodiment of the present invention includes a plurality of storage reels with associated take-up reels combined in a single dispenser for dispensing of various different medications at different dosages and intervals depending upon the requirements of a particular medication regimen.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
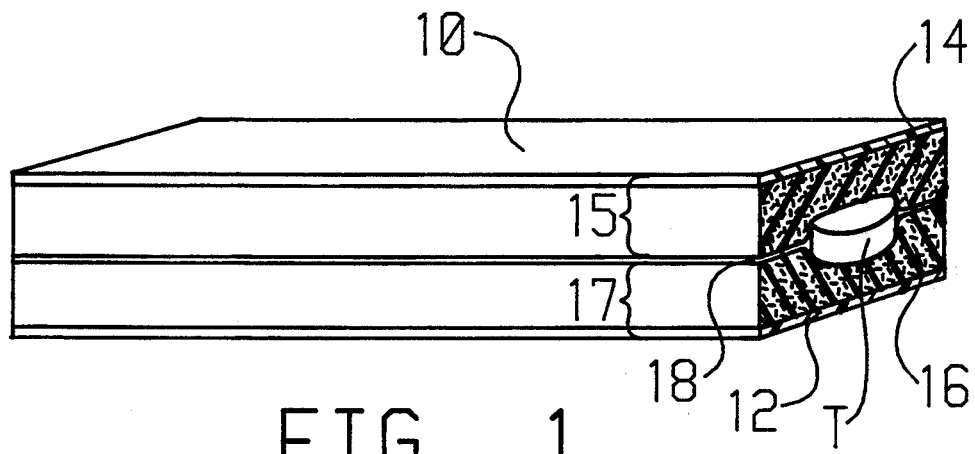
FIG. 1 is a perspective detail view of overlying band segments of the dispenser according to the present invention, each covered by an elastomer foam compressible material and holding a tablet sandwiched therebetween.

Referring now to the drawings, wherein like reference numerals designate corresponding structure throughout the views, and referring in particular to FIG. 1, the dispenser according to a preferred embodiment of the invention utilizes first 10 and second 12 bands formed from a flexible, but substantially non-compressible and non-stretchable, material such as plastic. Elongated compressible material strips 14 and 16, preferably formed from elastomer foam, are secured to respective facing surfaces of bands 10 and 12 and sandwich a medication unit such as tablet T therebetween at an abutment juncture 18. The compressible strips 14 and 16 deform to accommodate the shape of the medication unit, such that the two composite bands 15 and 17 effectively trap the medication unit T until such time as bands 15 and 17 separate to release the medication unit T. Parent application Ser. No. 07/414,454, which issued as U.S. Pat. No. 5,110,008, discloses the use of endless moving juxtaposed cooperating composite compressible belts to pick up and dispense medication units from a reservoir for dispensing, as illustrated in FIGS. 13-15 and 18 thereof.

Figure 2:
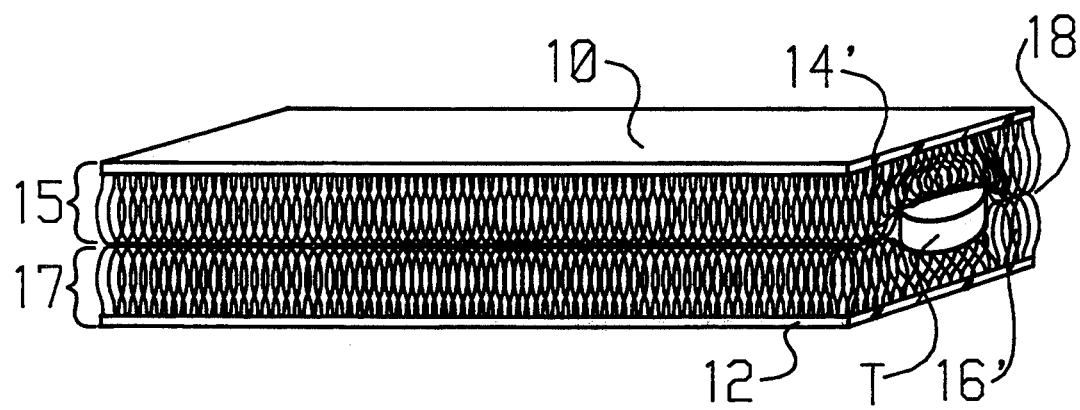
FIG. 2 is a perspective detail view of overlying band segments of the dispenser according to the present invention, each covered by a cloth compressible material and holding a tablet sandwiched therebetween.
Figure 3:
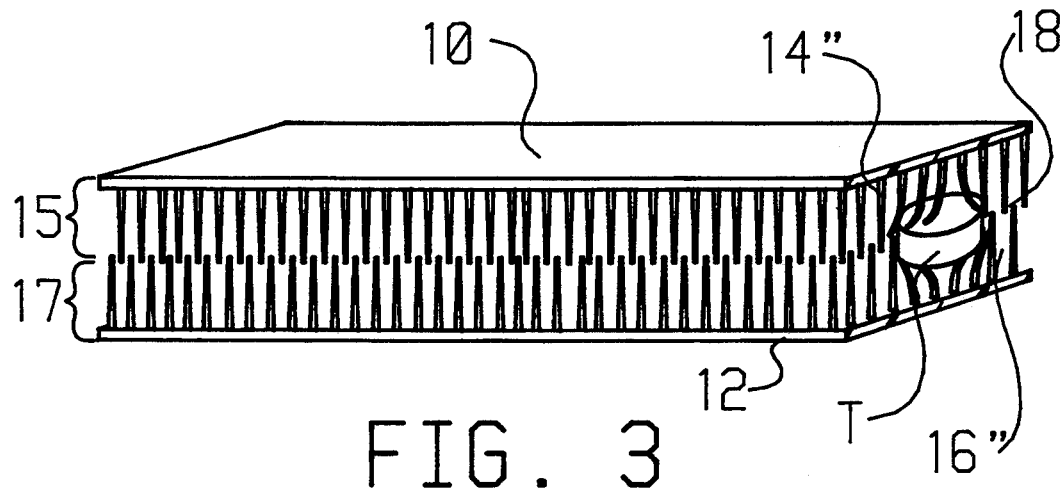
FIG. 3 is a perspective detail view of overlying band segments of the dispenser according to the present invention, each covered by a bristle brush compressible material and holding a tablet sandwiched therebetween.

The compressible material provides a high friction surface that holds the medication units in a substantially fixed relation between the bands 15 and 17. The compressible material also adapts to a wide variety of different medication sizes and configurations. In this context, the bands 15 and 17 may have a width sufficient to accommodate the largest intended medication unit, while still functioning to capture and store the smallest size medication unit. Alternatively, different width bands may be employed for different sized pills, tablets, caplets, and capsules. While elastomer foam (FIG. 1) is preferred, a variety of other compressible materials such as soft cloth 14', 16' (e.g. velvet, terry cloth) as shown in FIG. 2, or a bristle brush surface 14", 16" as shown in FIG. 3 may also be employed. Use of a low density open-cell elastomer foam allows maximal compression to minimize the dispenser volume. A moisture and powder impermeable covering over the elastomer foam may be provided with a plurality of vent holes to allow escape of air during compression.

As an alternative to compressible material, a noncompressible high friction material may be employed to form bands 15 and 17, however, a non-compressible material might allow a small amount of slippage of the medication units T between the two bands. Therefore, a band with a layer of compressible material would be preferable for most medication units since it would be more effective in preventing the medication units from shifting their position between the two bands.

Figure 4:
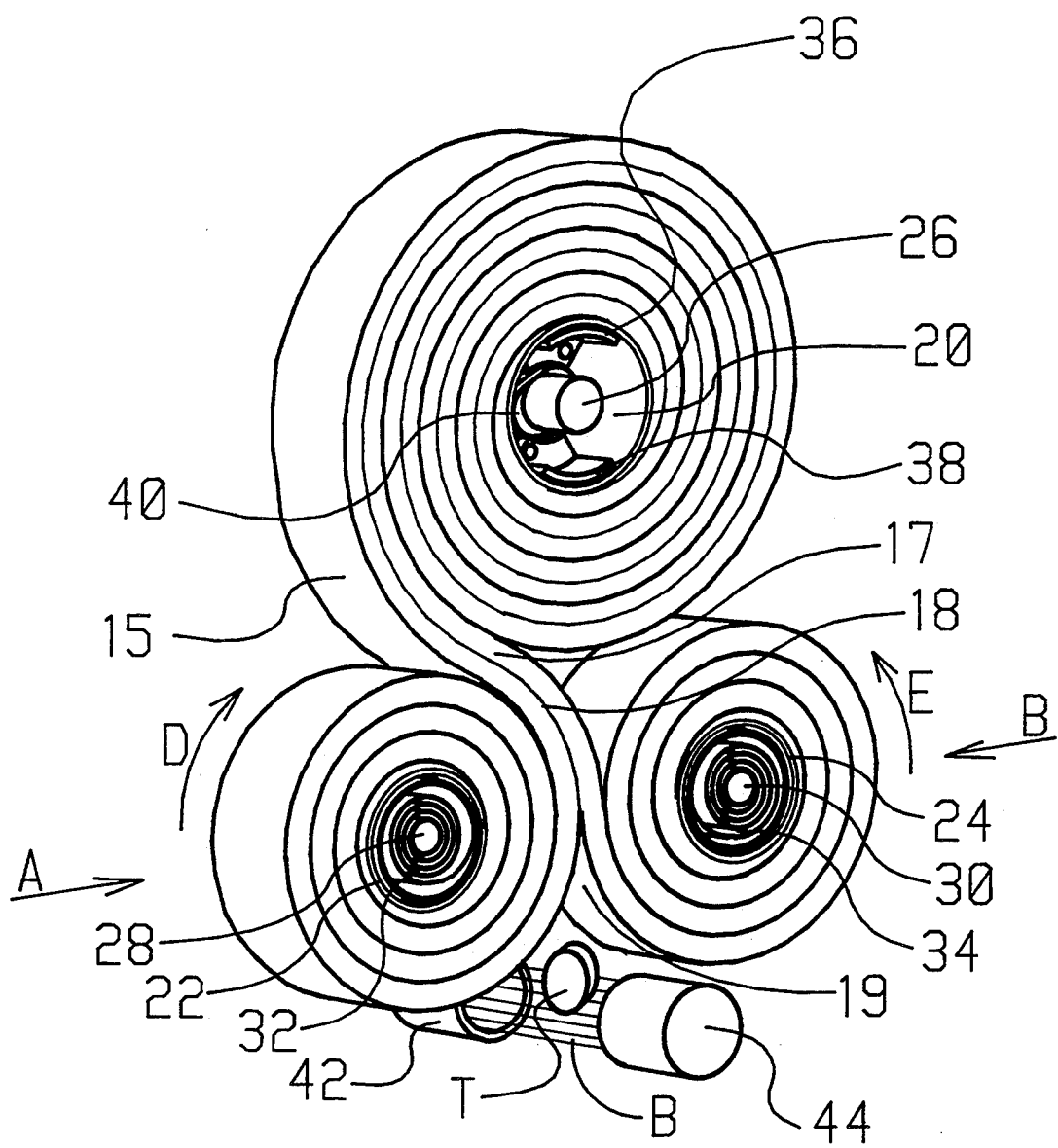
FIG. 4 is a diagrammatic perspective view illustrating the storage and take-up reel components of the dispenser according to the present invention.
Figure 4A:
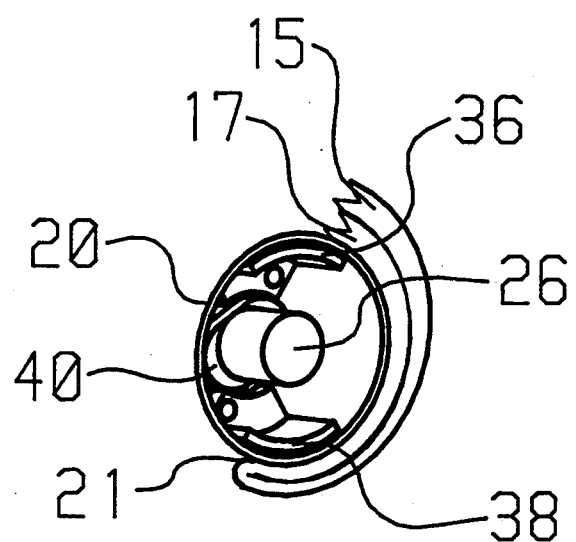
FIG. 4A is a partial perspective detail view illustrating securement of an overfolded band to the storage reel of the dispenser according to the present invention.

In accordance with the present invention, the medication units are initially captured between the composite compressible bands 15 and 17 wound in abutting overlying relation on a storage reel or spool 20, as shown in FIG. 4. The storage reel 20 is mounted for rotation on and relative to an axle 26. In the context of this description and the appended claims, the term "reel" should be construed in a broad sense as meaning a rotatable structure, not necessarily circular or cylindrical, capable of allowing bands 15 and 17 to be wound thereon. As shown in FIG. 4A, bands 15 and 17 may comprise opposite end portions of a single elongated band centrally overfolded at the radially innermost point of connection 21 to reel 20. In order to dispense the medication units T, release mechanisms including rotating devices such as clock springs 32 and 34 rotate a pair of separate take-up reels 22 and 24 about respective axles 28 and 30, causing the bands 15 and 17 to unwind from storage reel 20, separate adjacent a separation zone 19, and wind separately onto respective take-up reels 22 and 24. A brake mechanism for storage reel 20 includes radially pivotal shoes 36 and 38 mounted for rotation with reel 20 and activated by rotation of a cam 40 fixed to axle 26 into frictional engagement with the inner cylindrical sidewall of reel 20. The braking mechanism selectively restrains rotation of reel 20 in order to maintain, in conjunction with springs 32 and 34, sufficient tension on bands 15 and 17 to ensure controlled dispensing. The tension exerted by clock springs 32 and 34 also tightens the wrapping of bands 15 and 17 around storage reel 20 such that facing surfaces of bands 15 and 17 are in contact except in regions separated by a stored medication unit, thus maintaining the medication units in proper orientation between bands 15 and 17. As the bands 15 and 17 separate at zone 19, the medication units T fall by gravity, interrupting a light beam B directed from light source 42 toward photoelectric cell 44, thus providing a control input indicating dispensing of a single medication unit. Storage reel 20 and take-up reels 22 and 24 are mounted with a separation adequate to prevent interference contact between the outer surfaces of the reels.

Figure 22:
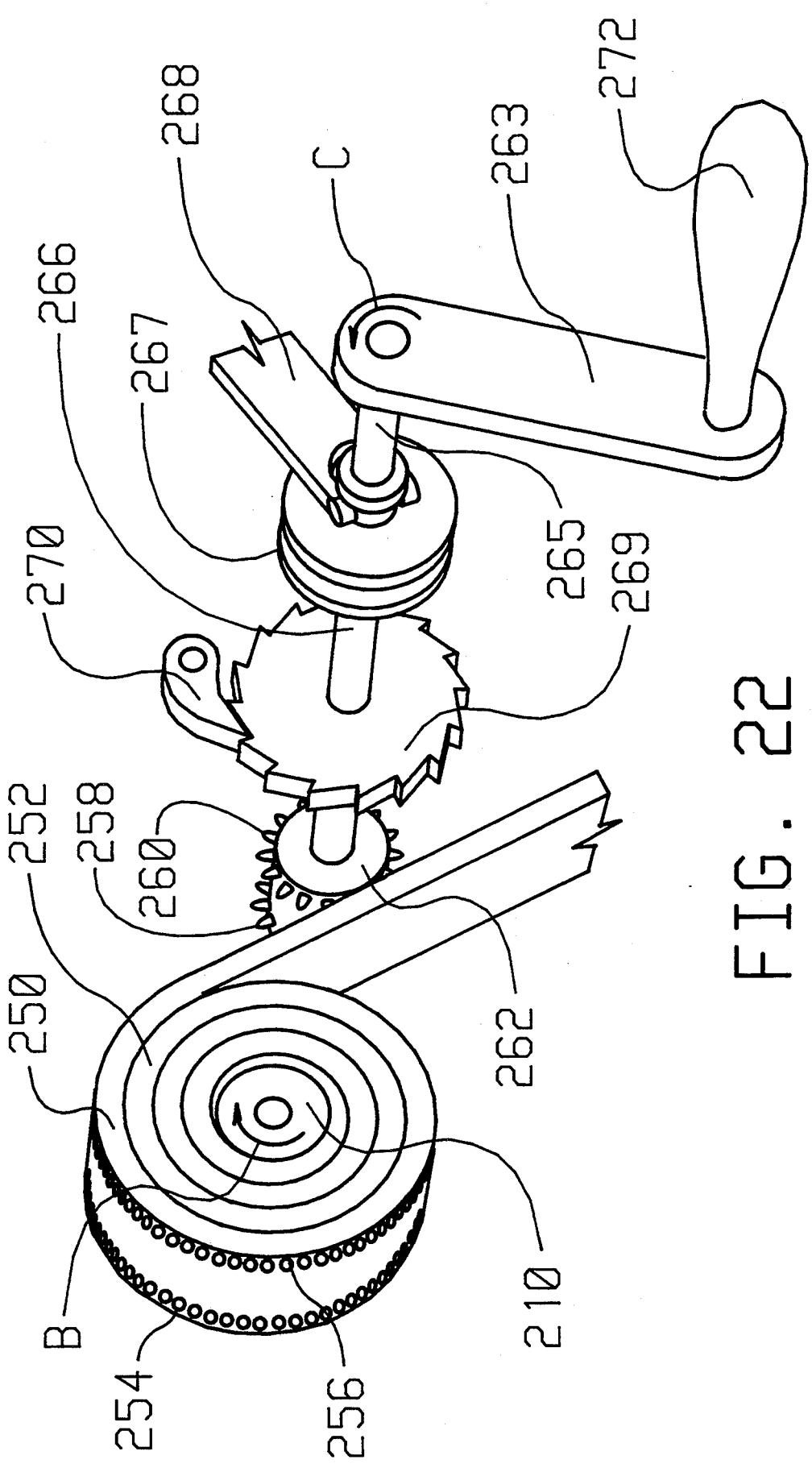
FIG. 22 is a perspective detail view illustrating a drive mechanism for use with the dispenser of FIG. 18.

Take-up reels 22 and 24 may be rotated by a wide variety of other mechanisms within the scope of the invention. Electric motor, spring, and manual hand cranks may be employed, alone or in any combination, to rotate take-up reels 22 and 24. An example hand crank drive mechanism is illustrated in FIG. 22.

Figure 8:
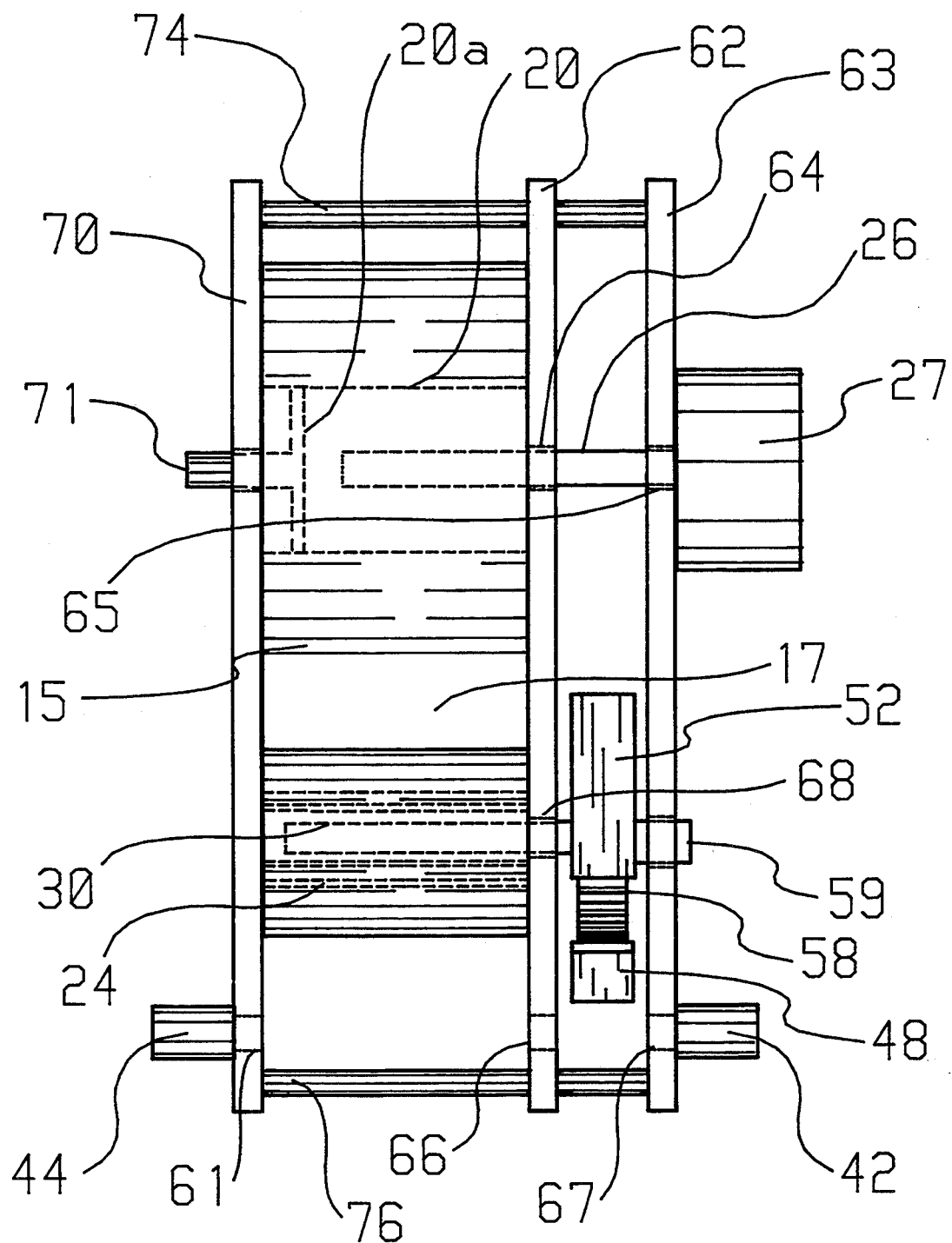
FIG. 8 is an end elevational view illustrating the dispenser according to the present invention.

The device may be filled by inverting the dispenser such that the storage reel 20 is lower most and rotating the storage reel 20 while introducing medication units into the dispenser one by one at the separation zone 19. Rotation of storage reel 20 during refilling may be effected by engagement of a hand crank, such as hand crank 263, 272 shown in FIG. 22, to a hexagonal drive shaft 71 (FIG. 8) fixed for rotation with storage reel 20. The drive shaft 71 is not part of or connected for rotation with the brake activation axle 26, but rather is attached to disc 20a which forms one end of storage reel 20. An inclined fill trough (not shown) possessing an outlet end overlying the separation zone 19 may be employed to facilitate the orderly introduction of medication units one by one between bands 15 and 17 as they are wound on reel 20.

Figure 5:
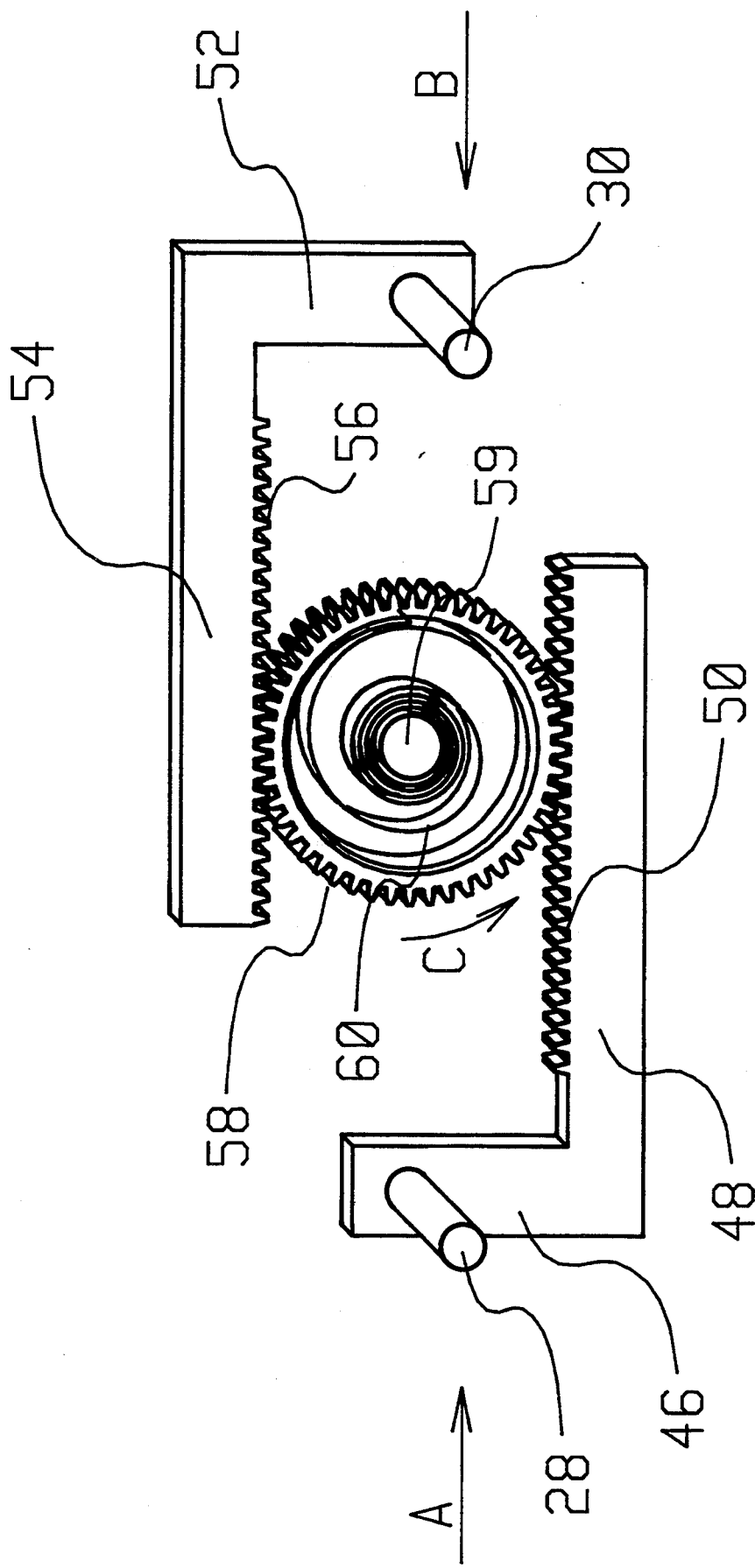
FIG. 5 is a perspective view illustrating the take-up reel positioning mechanism of the dispenser according to the present invention.
Figure 6:
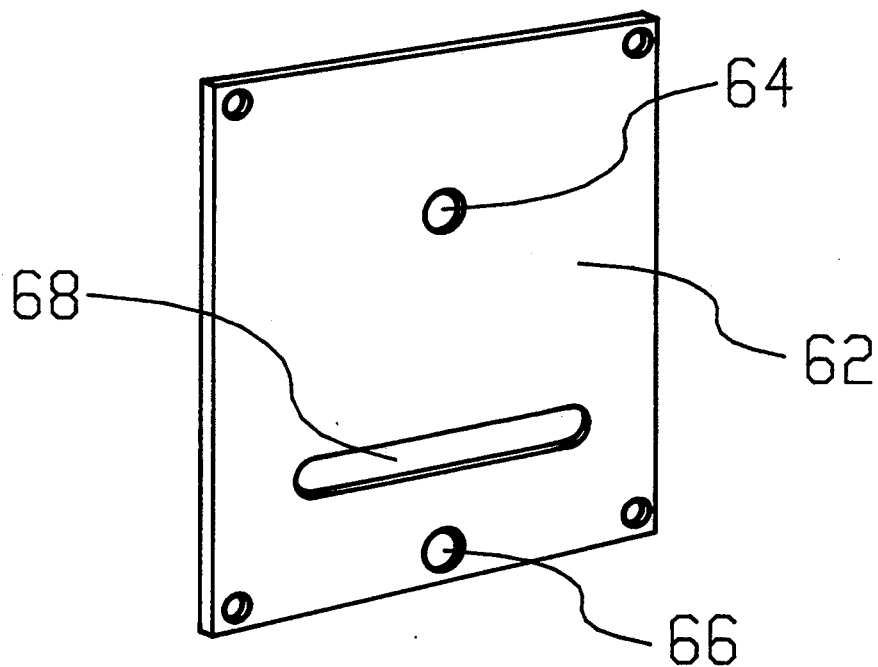
FIG. 6 is a perspective view illustrating an interior partition wall of the dispenser according to the present invention.

In order to provide self-adjustment of the spacing of reels 22 and 24 to compensate for the increasing diameter of the reels 22 and 24 as bands 15 and 17 wind thereon, a take-up reel positioning mechanism illustrated in FIG. 5 biases the rotationally stationary take-up reel support axles 28 and 30 together, in the directions indicated by arrows A and B. A pair of L-shaped bars possess respective vertical 46, 52 and horizontal 48, 54 leg portions dimensioned and disposed to place axles 28 and 30 in transversely spaced alignment, such that the central longitudinal axes of axles 28 and 30 are collinear with the central longitudinal axis of an axle 59 of a pinion gear 58. A clock spring 60 rotationally biases gear 58 about axle 59 in the direction indicated by arrow C. Engagement of gear 58 with gear racks 50 and 56 results in the application of transverse bias forces to axles 28 and 30, in the directions indicated respectively by arrows A and B. As will now be readily understood with reference to FIGS. 4 and 5, rotation of take-up reels 22 and 24 and resultant winding of bands 15 and 17 thereon causes the axles 28 and 30 to be forced transversely apart to the necessary extent, against the bias forces A and B, maintaining the separation zone 19 in an essentially constant position.

Figure 7:
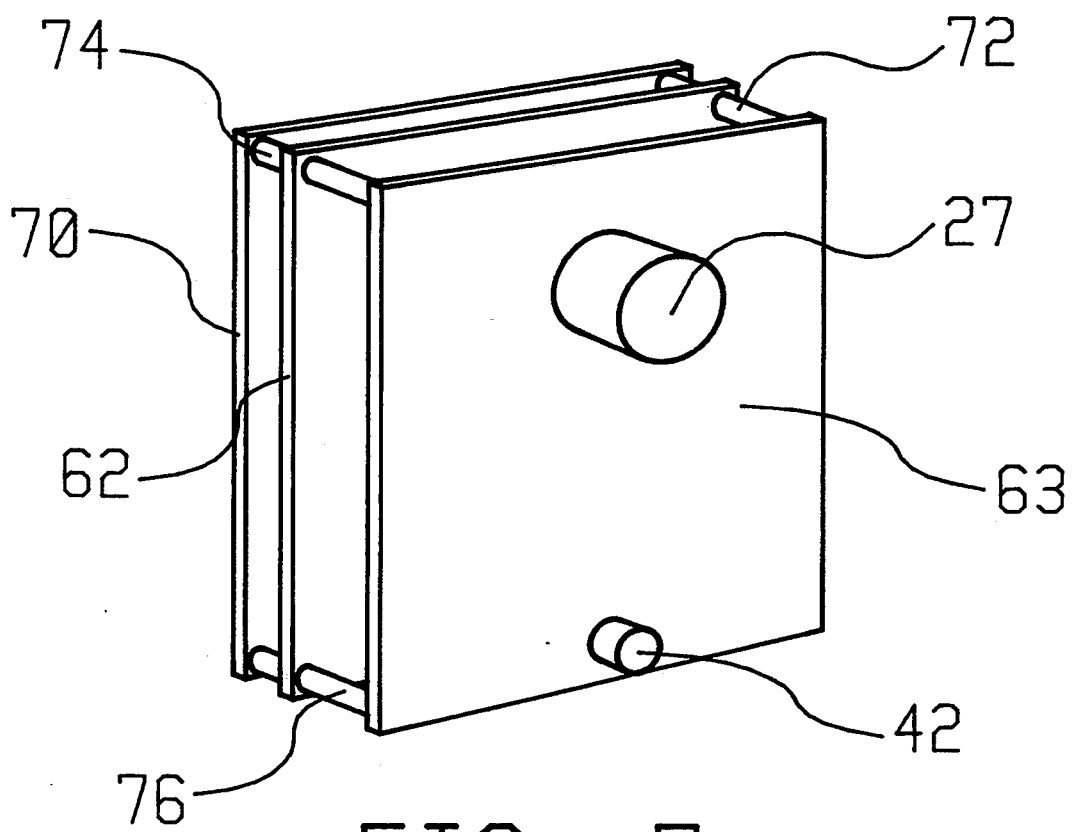
FIG. 7 is a perspective view illustrating the housing of the dispenser according to the present invention.

With reference to FIGS. 6 through 9, in forming the actual finished dispenser, the reels 20, 22, and 24 (FIG. 4) and the positioning mechanism (FIG. 5) are preferably disposed on opposite sides of a rectangular partition wall or plate 62. Alternatively, two take-up reel position adjusting mechanisms as illustrated in FIG. 5 may be mounted on opposite sides of the take-up reels 22 and 24, separated, if desired, by suitable partitions or sidewalls. Aperture 64 receives axle 26 of storage reel 20, while aperture 66 allows passage of detector light beam B (FIG. 4). Elongated transverse slot 68 receives axles 28 and 30, while allowing automatic adjustment of axle separation within the limits of the device, dependent upon the number of wraps of bands 15 and 17 on reels 22 and 24. Four corner spacing rods (three of which, 72, 74, and 76, are shown in FIG. 7) extend between exterior rectangular sidewalls 63 and 70, through partition 62. At least in the area adjacent storage reel 20, partition 62 and sidewall 63 contacts the side face of storage reel 20 and side edges of bands 15 and 17 to prevent the possibility of medication units from slipping out from between the bands. Light source 44 directs a sensing light beam through aperture 61 in sidewall 70, aperture 66 in partition 62, aperture 67 in sidewall 63, and to photocell 42. The take-up reel position adjusting mechanism ensures that dispensing zone 19 is always positioned to drop dispensed medication units through beam B. Axle 26 of storage reel 20 extends through aligned apertures 64 and 65 in partition 62 and sidewall 63, such that a rotating mechanism such as a rotary solenoid 27 may rotate axle 26 and attached cam 40 (FIG. 4) in order to selectively engage the brake shoes 36 and 38 with the interior surface of storage reel 20. As an alternative to the clock springs 32 and 34 illustrated in FIG. 4, an electric motor may be used to drive one of the take up reels, or electric motors may be used to drive both of the take up reels 22 and 24. When one or more electric motors are used it would be possible to construct the device without a brake by using friction between reel 20 (and/or bands wrapped thereon) and side wall 70 and between reel 20 (and/or bands wrapped thereon) and partition 62 to inhibit the motion of the storage reel 20. The electric motors would advance the reels 22, 24 the required distance and the friction would control the motion of the storage reel 20. Alternatively, a spring that biased the storage reel 20 in a clockwise direction as the device is viewed in FIG. 4 could be used to control the motion of the storage reel 20.

Alternatively, one of more of the take up reels could be turned by a hand crank attached to the reels with an intervening clutch together with a ratchet, as shown in FIG. 22, to prevent reverse motion of the band. When the bands had been advanced the required distance the clutch would be disengaged. When either a hand crank or motor was used to advance one the reels, a spring could be used with the storage reel 20 and other uptake reels 22, 24 to maintain tension on the bands.

In such alternative constructions, motors and associated drive connections may be mounted on and through sidewalls 63 and 70. Axle 59 of gear 58 passes centrally through slot 68 in partition 62 and is fixed to sidewall 63.

Occasionally, the medication units may drop to one side of the light beam and its removal would not be recorded. This would be most likely to occur if the medication unit was very small. To avoid such a non recording of a medication unit removal, the light beam could be reflected back and forth over a wider area below zone 19 to create a series of closely spaced beams one or more of which would be interrupted by any medication unit that left the dispenser. This could be achieved by moving the aperture 67 in side wall 63 and aperture 66 in partition 62 to the right when the device is viewed as in FIG. 5, and the corresponding aperture 61 in side wall 70 to the left together with mirrors on the surfaces of side wall 70 and partition 62 which face one another so that said light beam passed back and forth between said side wall 70 and the partition 62 several times.

Figure 9:
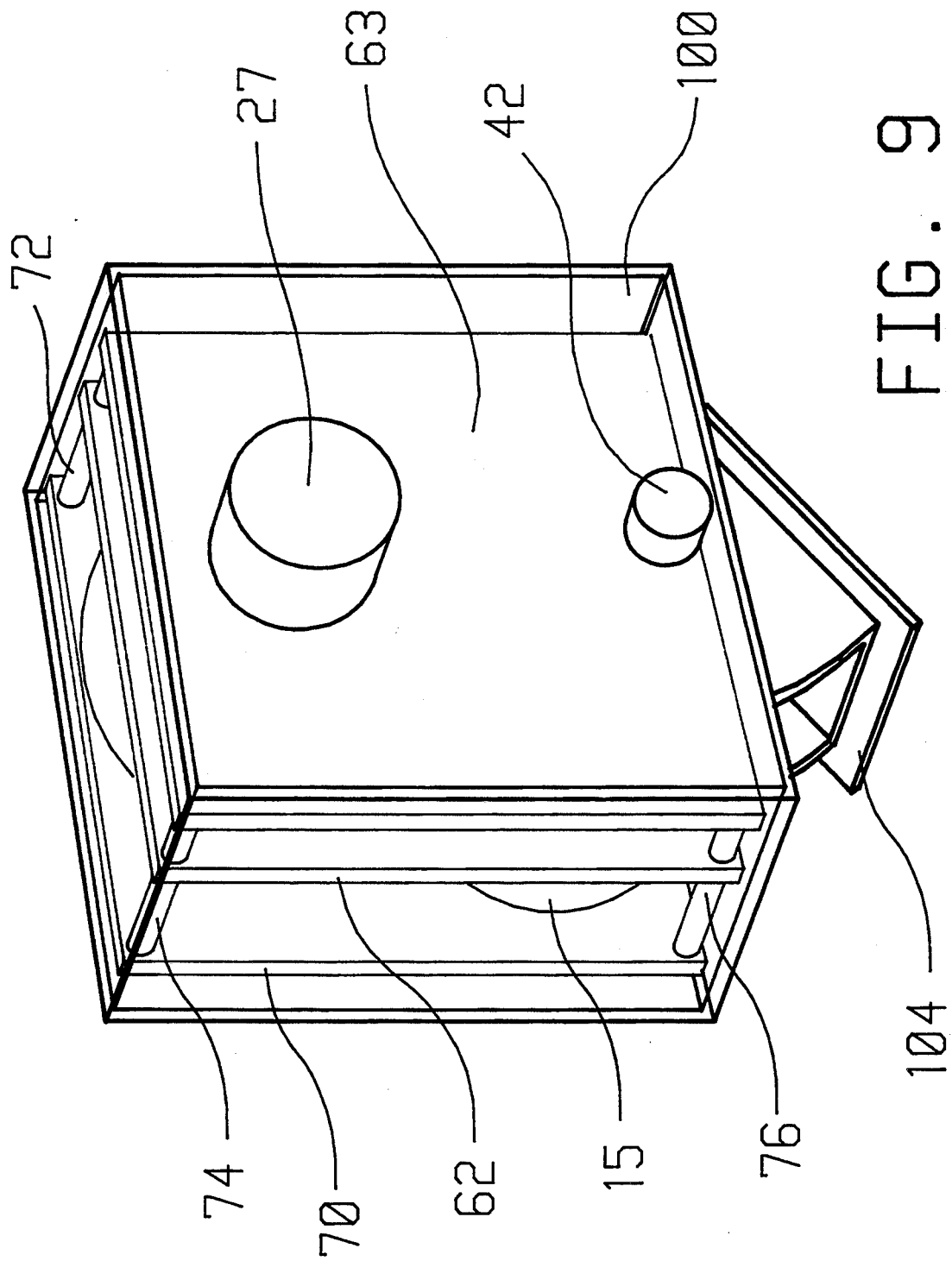
FIG. 9 is a perspective view illustrating the dispenser according to the present invention mounted within a transparent protective housing.

As shown in FIG. 9, the dispenser preferably includes a waterproof housing 100 possessing a pivotal dispensing door 104 to allow removal of dispensed medication units.

Figure 10:
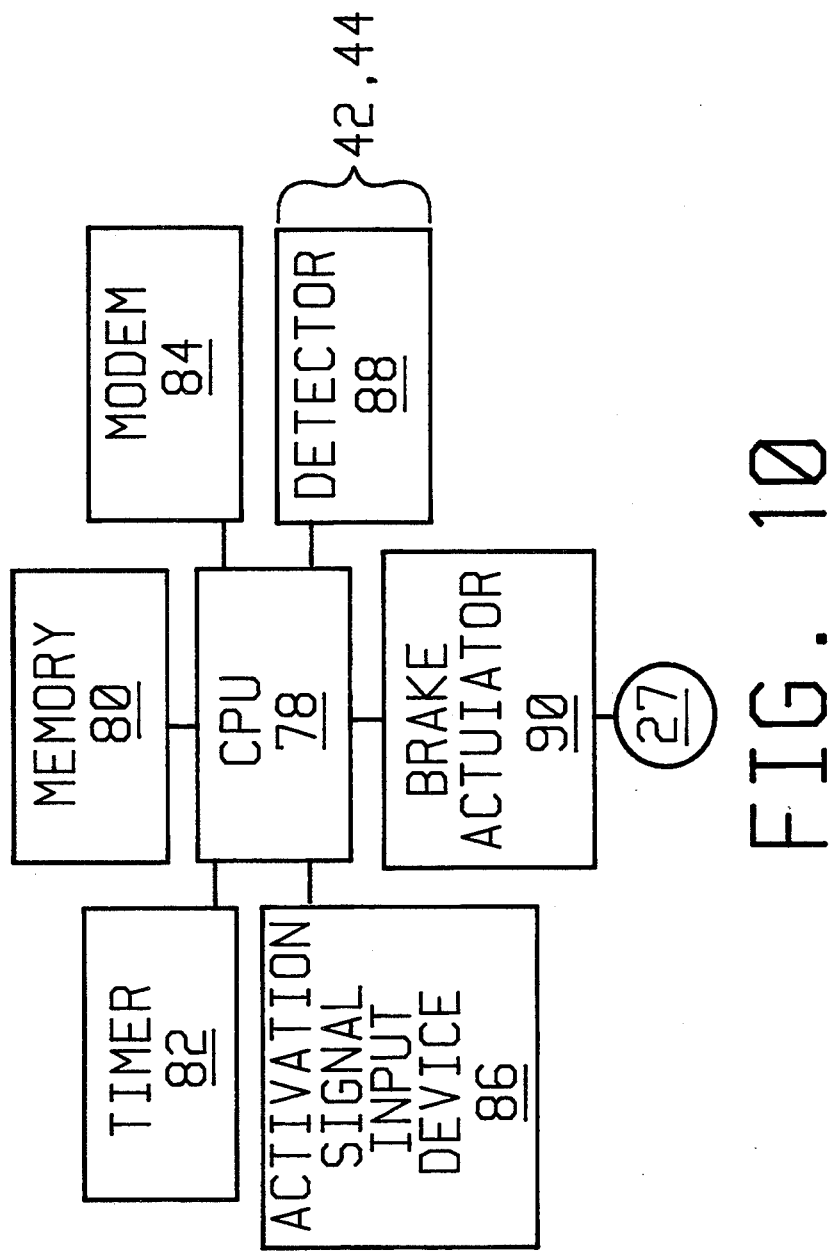
FIG. 10 is a block diagram illustrating the control system of the dispenser according to the present invention.
Figure 11:
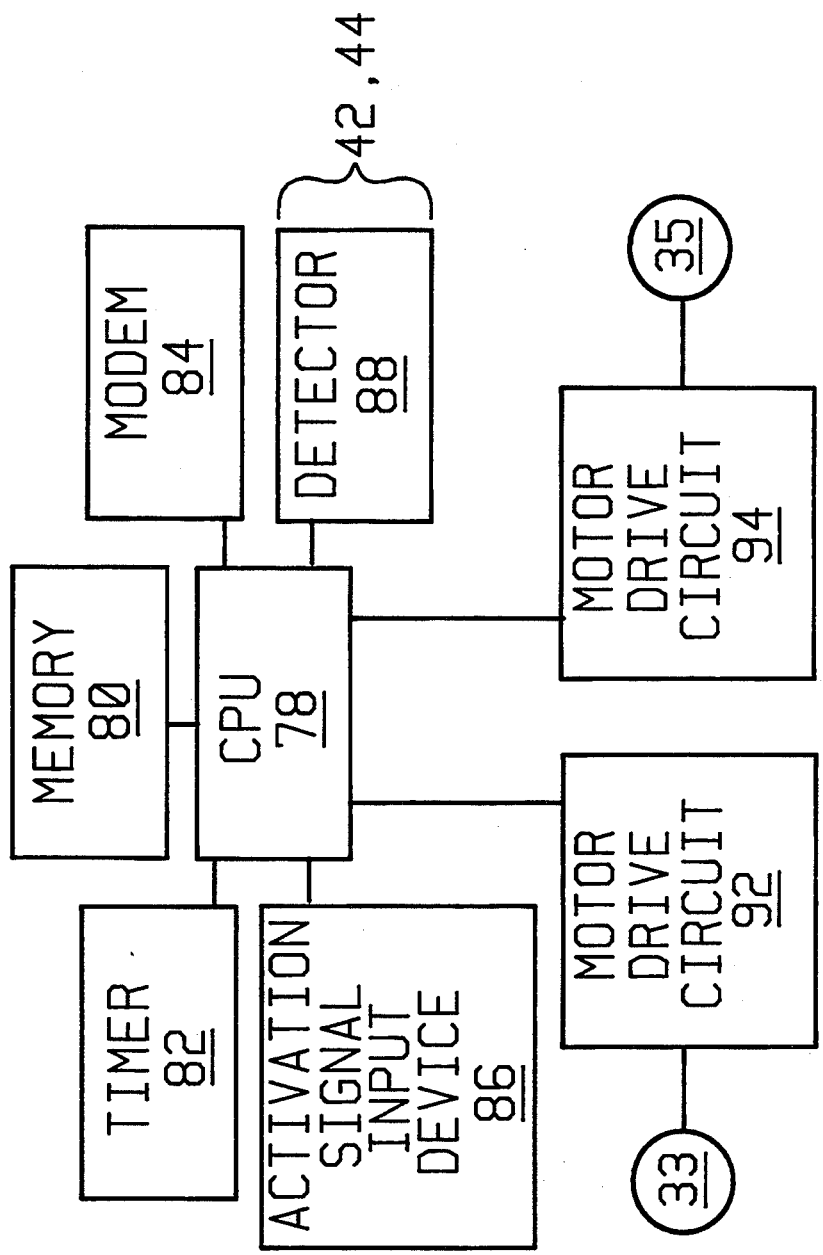
FIG. 11 is a block diagram illustrating the control system of an alternative embodiment of the dispenser according to the present invention.

FIG. 10 illustrates a first example control system, in which a CPU 78 interfaces with memory 80 for storing a predetermined medication regimen, potentially including type, quantity, and time parameters defining the different types, dosages, and administration times of various medications. A timer 82 (such as a conventional lithium battery powered clock of the type used in personal computers) interfaces with CPU 78 to allow determination of time parameters of desired dose administration. A modem 84 interfaced with CPU 78 allows reprogramming of the medication regimen from a remote location by individuals such as physicians, pharmacy personnel, etc. An activation signal input device 86 such as a push button switch or voice activation circuit is provided to allow the patient or care giver to activate the dispenser. When timer 82 and CPU 78 determine medication should be dispensed according to a preprogrammed regimen, CPU 78 sends a signal to brake actuator 90 in order to activate a rotary solenoid 27 to rotate axle 26 (FIG. 6), effecting release of storage reel brake shoes 36 and 38 through movement of cam 40, whereupon clock springs 32 and 34 cause bands 15 and 17 to unwind from reel 20 onto take-up reels 22 and 24, causing a medication unit T to fall from separation zone 19, breaking light beam B between source 42 and photocell 44. Friction between partition 62 and sidewall 70 and bands 15 and 17 slows the movement of bands 15 and 17 and reels 20, 22, and 24 so more than the prescribed number of medication units will not be dispensed in a short period of time. Detector 88 (comprising light source 42 and photocell 44) provides a feedback indication to CPU 78 as each medication unit is dispensed. Timer 82 then determines when the medication unit is dispensed and a counting circuit or routine associated with CPU 78 is operative to store the number of dispensed medication units sensed by detector 88 in memory 80 together with the time of medication removal. After detection of the dispensing of the requisite number of medication units by detector 88, CPU 78 sends a signal to brake actuator 90 causing rotary solenoid 27 to again engage the brake shoes 36 and 38 with storage reel 20. In the alternative control system depicted in FIG. 11, CPU 78 interfaces with electric motor drive circuits 92 and 94 which control electric motors 33 and 35 operative to selectively rotate take-up reels 22 and 24.

If a hand crank and clutch (FIG. 22) is used to advance the band, a control system similar to the control system used for controlling the electric motor could be used to control the engagement and disengagement of the clutch.

A single storage reel and take up reel set could be used to dispense a plurality of different medications by filling the storage reel with the various different medications in sequential order depending on the time when each medication should be taken, and using the control system to advance the bands each time medication is taken, until the number of medication units that should be dispensed at that point in time were detected by the light beam photodetector system. Accordingly, with such a single storage reel system, the storage reel must be emptied and refilled to change the medication regimen.

Figure 12:
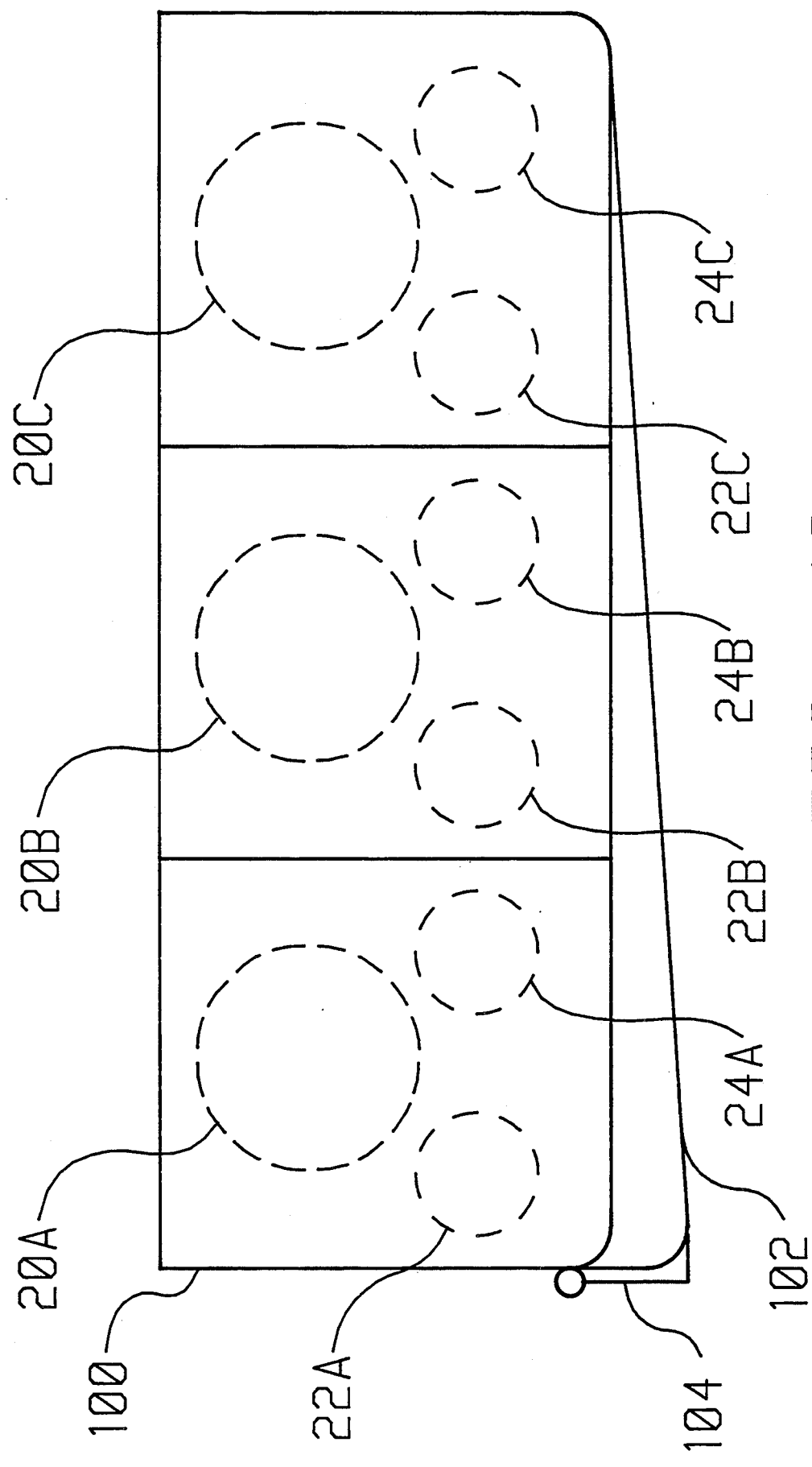
FIG. 12 illustrates a dispenser according to the present invention which employs a plurality of storage and take-up reel sets to enable a variety of different medications to be dispensed pursuant to a predetermined, easily changeable, medication regimen.

In order to allow a plurality of different medications to be dispensed without the need for such sequential ordering, a dispenser as shown in FIG. 12 includes a plurality of discrete storage and associated take-up reel sets, as indicated at 20A, 22A, 24A; 20B, 22B, 24B; 20C, 22C, 24C. Each of the separate reel sets are detachably mounted, preferably in the form of individual cartridges or cassettes, within a moisture-proof housing 100 to allow medication in these cassettes to be added or deleted from a regimen without disturbing the medications in the other cassettes. The control system is operative to control each of the various reel sets, each of which may store a different medication, pursuant to a programmed regimen, to cause any one or more reel sets to dispense medication units onto an inclined trough 102 and subsequently to a dispensing opening covered by a moisture-proof cap 104. The individual cartridges need not necessarily be oriented in the illustrated array, but may be configured in a wide variety of different orientations within the scope of the invention. For example, the side wall 63 of each cartridge may be aligned parallel to the side wall 70 of the next cartridge to create a linear array of cartridges which direct dispensed medication to a common central dispensing funnel. Alternatively, a plurality of cartridges may be disposed in a circular array to direct dispensed medication units to a common central dispensing funnel. Each individual cartridge includes separate take-up reel rotary drive mechanisms and storage reel braking mechanisms, as well as conventional quick-release electrical connections to interface with a common control system. If a patient is taking a large amount of a bulky medication such as GAVISCON TM, the length of the bands 15 and 17 on each storage reel 20 could be quite large. Alternatively, several small storage and take-up reel sets may be employed in conjunction with electronic controls to sequentially dispense the medication units from several reel assemblies.

Figure 13:
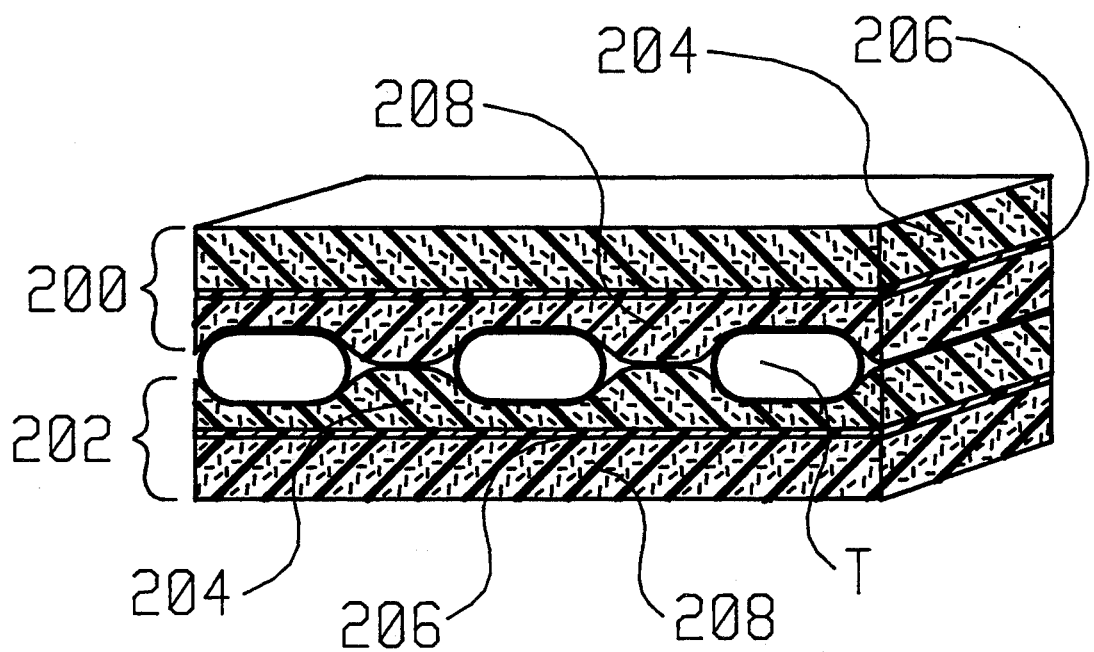
FIG. 13 is a perspective detail view of overlying layers of a single composite band, formed from a flexible, non-stretchable band having opposite faces laminated to bands formed from compressible material, and holding medication units sandwiched therebetween.
Figure 15:
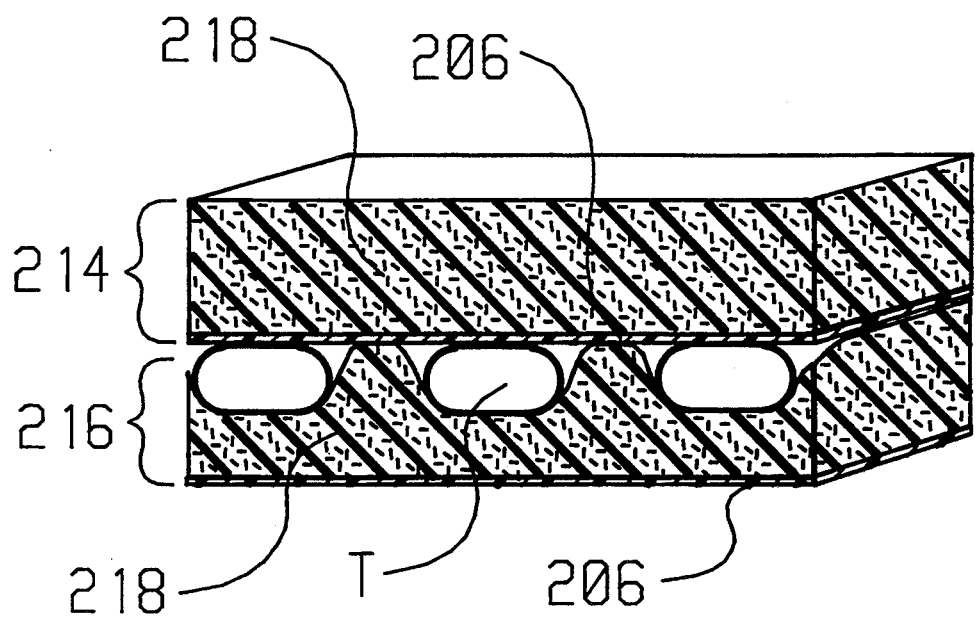
FIG. 15 is a perspective detail view of overlying layers of a single composite band, formed from a flexible, non-stretchable band having one face laminated to a band formed from compressible material, and holding medication units sandwiched therebetween.

FIG. 13 illustrates two overlying wrapped layers 200, 202 of a single composite band with medication units T sandwiched therebetween. Each layer 200, 202 consists of a flexible but non-stretchable band 206 having both opposite faces laminated to respective compressible material bands 204 and 208. As described previously, suitable materials for the compressible material bands 204 and 208 include elastomer foam, fabric, or a bristle brush. As an alternative to a composite laminated construction, the band may be formed from a single compressible material stretchable to a minimal extent. A terry cloth material of the type utilized in ordinary bath towels is an example of one material suitable for this purpose. As a further alternative, the composite band may consist of a flexible, non-stretchable band 206 having a compressible material band 218 laminated to only a single face, as illustrated in FIG. 15. A suitable compressible material is a pile fabric of the type utilized in rugs.

Figure 14:
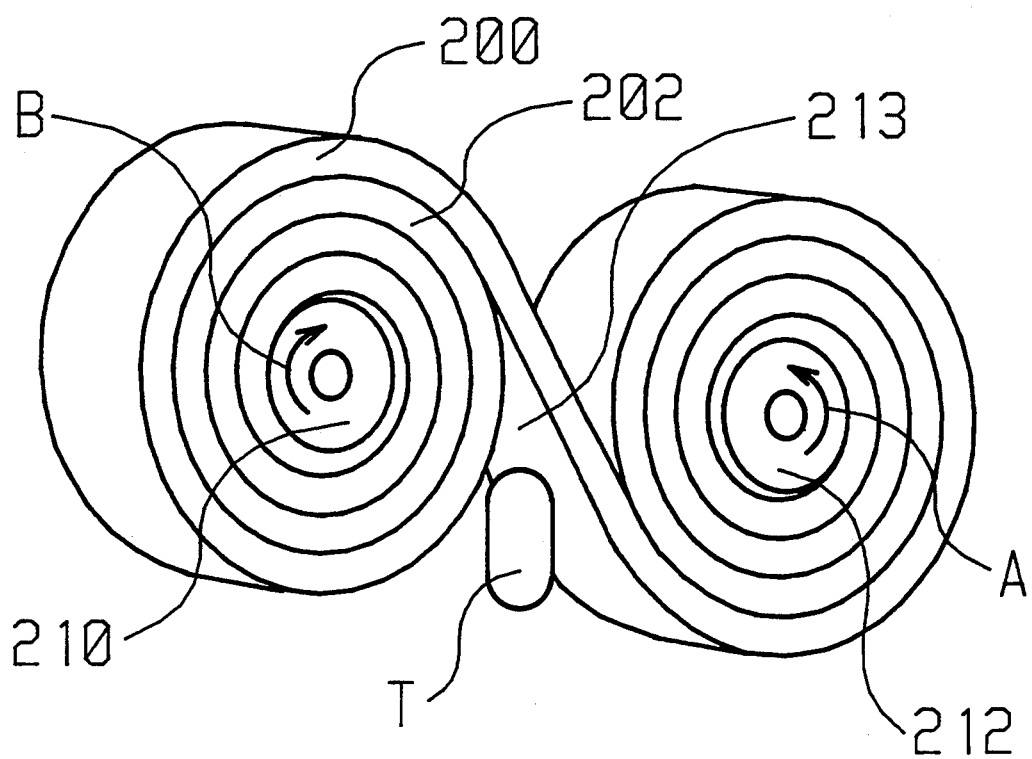
FIG. 14 is a diagrammatic perspective view illustrating a dispenser according to the present invention including a storage reel and a single take-up reel.

As can be readily understood with reference to FIG. 14, the layers 200 and 202 comprise the two outermost layers on a storage reel 210. The single composite band wound upon the storage reel 210 includes an opposite end secured to and wound upon a single take-up reel 212. Rotation of takeup reel 212 in the direction of arrow A and storage reel 210 in the direction of arrow B causes the band to unwind from the storage reel 210 and to wind upon the take-up reel 212. The medication units T captured between the layers 200 and 202 will drop free in the separation zone 213 disposed generally between the two reels 210 and 212, where they may be detected by interruption of a light beam, as described above with reference to FIG. 4. The reels 210 and 212 may be rotationally driven or held stationary by any of the drive and braking mechanisms described above in connection with FIGS. 4 through 12.

Figure 16:
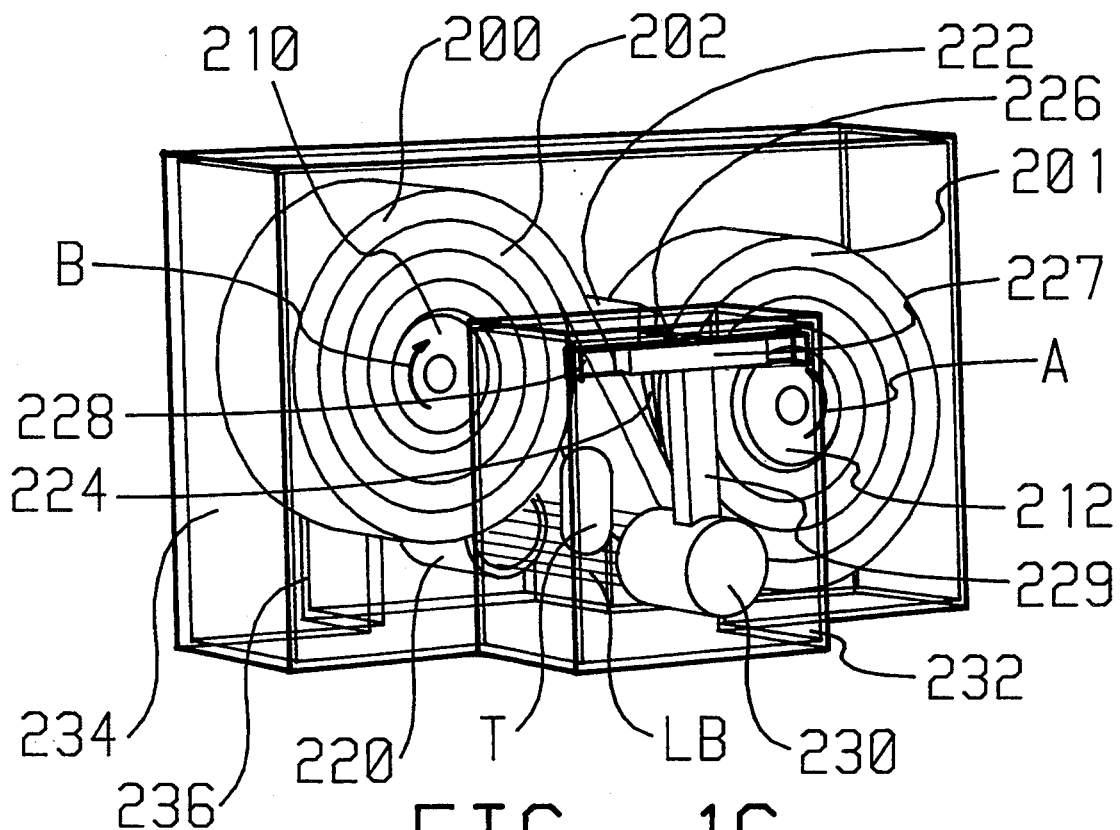
FIG. 16 is a perspective view of a dispenser according to the present invention possessing a single storage reel and a single take-up reel and including a detector for detecting dispensed medication units.
Figure 17:
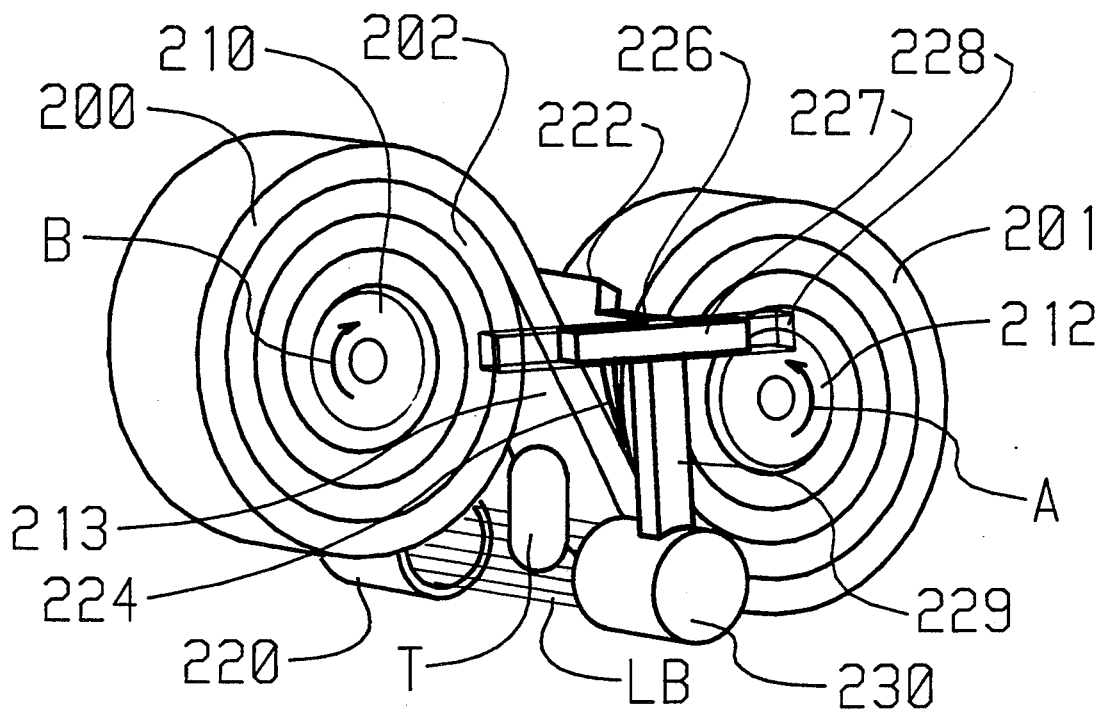
FIG. 17 is a perspective detail view further illustrating the dispenser of FIG. 16.

As the band winds from storage reel 210 onto takeup reel 212, the diameters of the reels 210 and 212 will change, causing the location of the separation zone 213 to continuously shift, depending on the number of layers on the two reels 210 and 212. FIGS. 16 and 17 illustrate a dispenser including a mechanism for shifting the photoelectric cell 220 and light source 230 of a detector for sensing the fall of medication units T in separation zone 213. A wedgeshaped guide 222 includes a tapered end 224 formed from a low friction material and disposed in the cleft between the outermost layer 201 of the band on the take-up reel 212 and the portion of the band that runs between the storage reel 210 and the take-up reel 212. A laterally extending strut 226 connects the guide 222 to a slider 227 mounted for reciprocal sliding movement within a guide track or slot 228. A vertical column 229 suspends the light source 230 from the slider 227 for movement therewith. The dispenser storage reel 210 and take-up reel 212 are mounted within a housing 234 including a lateral extension portion 232 housing the light source 230 and related position adjusting components. A symmetrically formed opposite housing extension portion 236 houses identical strut, slider, and guide track components for moving the photoelectric cell 220 in unison with the light source 230 and guide 222. Accordingly, as medication units T are dispensed, the amount of the composite band on the take-up reel 212 will increase, forcing the guide 222 to the left, and in turn moving light source 230 and cooperating photoelectric cell 220 to the left so as to keep the light beam LB under the separation zone 213 in order that medication units T will interrupt the light beam LB as they fall within the separation zone 213.

Alternatively, the guide 222 may be disposed in the cleft between the outermost portion of the composite band on the storage reel 210 and the portion of the composite band that runs between the storage reel 210 and the take-up reel 212. However, since there are medication units between these two portions of the composite band, the guide 222 would preferably be limited to the lateral most portions of the cleft between the two portions of the composite band or else the guide 22 would obstruct the removal of the medication units T. Furthermore, in contrast to the construction shown in FIGS. 16 and 17, the end of the guide 222 would have to be relatively thick and rounded, because a thin tapered guide 222 would tend to dig into the compressible material and inhibit the motion of the composite band.

Alternatively, a light beam could be reflected back and forth over a wider area below the separation zone 213 to create a series of closely spaced beams one or more of which would be interrupted by any medication unit that left the dispenser as previously described in connection with the dispensing system shown in FIG. 4. With this type of multiple beam detecting system the mechanism described above for shifting the position of the photoelectric cell 220 and the light source 230 would not be needed.

Figure 18:
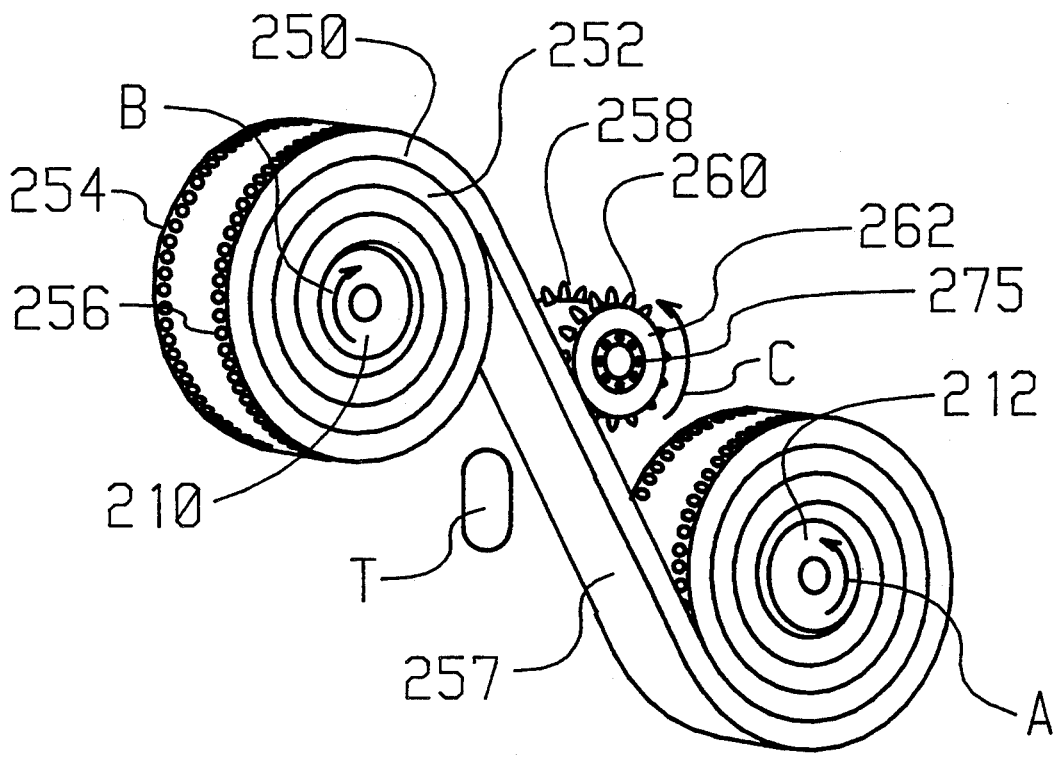
FIG. 18 is a diagrammatic perspective view illustrating a dispenser according to the present invention possessing a single storage reel and a single take-up reel with a band wound thereon driven by a sprocket to dispense medication units.
Figure 19:
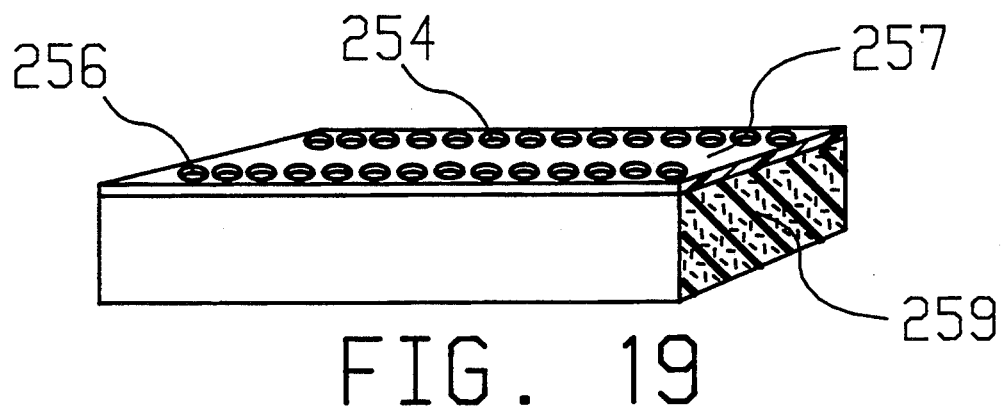
FIG. 19 is a perspective detail view of a composite band formed from a flexible, non-stretchable band having one face laminated to a band formed from compressible material and provided with sprocket holes for engagement with a drive sprocket.

FIGS. 18 and 19 illustrate a dispenser according to the present invention in which a single composite band is wrapped on a storage reel 210 and a take-up reel 212. Movement of the band is effected by engagement of circular teeth arrays 258 and 260 on a sprocket 262 with parallel spaced linear sprocket hole arrays 254 and 256 disposed along opposite longitudinal side edges of the band. The band includes a non-stretchable band 257 provided with sprocket holes 254 and 256 and having one face laminated to a compressible material band 259. The sprocket holes 254 and 256 may be provided along one or both opposite faces of the non-stretchable portion of the composite band. Tension on the band can be maintained by springs associated with either or both of the reels 210 and 212, or by other braking or restraining mechanisms. Take-up reel 212 preferably includes a spring or other rotational bias mechanism to ensure that the band is tightly wound thereon, and to prevent slack or bowing of the band portion between the reels 210 and 212. To dispense medication units T, sprocket 262 is rotated in the direction indicated by arrow C, causing storage reel 210 to rotate in the direction of arrow B, and allowing the take-up reel 212 to rotate in the direction of arrow A. If the medication units T are separated and uniformly spaced from one another and the sprocket 262 is turned so that the composite band is advanced a definite specific distance equal to the distance between corresponding points on two adjacent medication units T, a medication unit T will be dispensed each time the sprocket 262 is advanced, thus making it possible to assume that a medication unit was dispensed without actually detecting that it was removed. Similarly, two or more medication units may be placed along that portion of the composite band that will be advanced each time the sprocket is turned. As long as a uniform number of medication units T are placed in this space, one can assume that this uniform number of medication units T is dispensed each time the sprocket 262 is advanced a specific distance. A conventional rotary encoder 275 is one example of a device that could be used to determine when the sprocket 262 has advanced the predetermined specific distance.

The sprocket need not necessarily be positioned between the storage reel 210 and take-up reel 212 as shown in FIG. 18. For example, the sprocket 262 could drive the take-up reel 212 by positioning the sprocket 262 to the right side of the take-up reel 212 as viewed in FIG. 18. Similarly, the sprocket 262 could be positioned to the left side of the storage reel 210 so as to drive the storage reel 210. In either case, the composite band can be kept tightly wound on the reels 210 and 212 by the provision of rotational bias springs on the reels 210 and 212.

A sprocket drive mechanism may also be employed in conjunction with the dispenser embodiment illustrated in FIG. 4. In this case the sprocket may be positioned in contact between the outer layer of band 15 on the storage reel 20 or in the space between the take-up reel 24 and the storage reel 20, in contact with band 17 where the non-stretchable component of the band which contains the sprocket holes is not covered with the compressible material of the adjacent band or adjacent layer of the same band.

Figure 20:
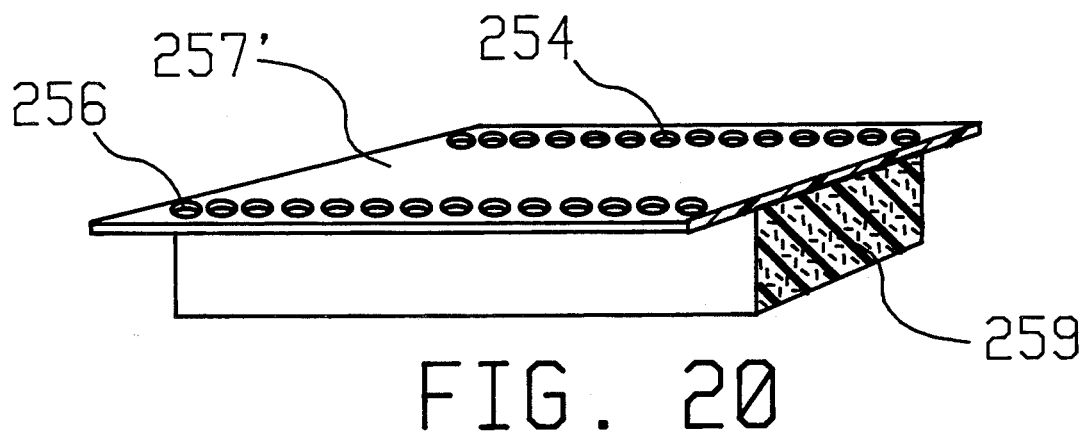
FIG. 20 is a perspective detail view of a composite band formed from a flexible, non-stretchable band having one face laminated to a band formed from compressible material and provided with laterally outwardly offset sprocket holes for engagement with a drive sprocket.
Figure 21:
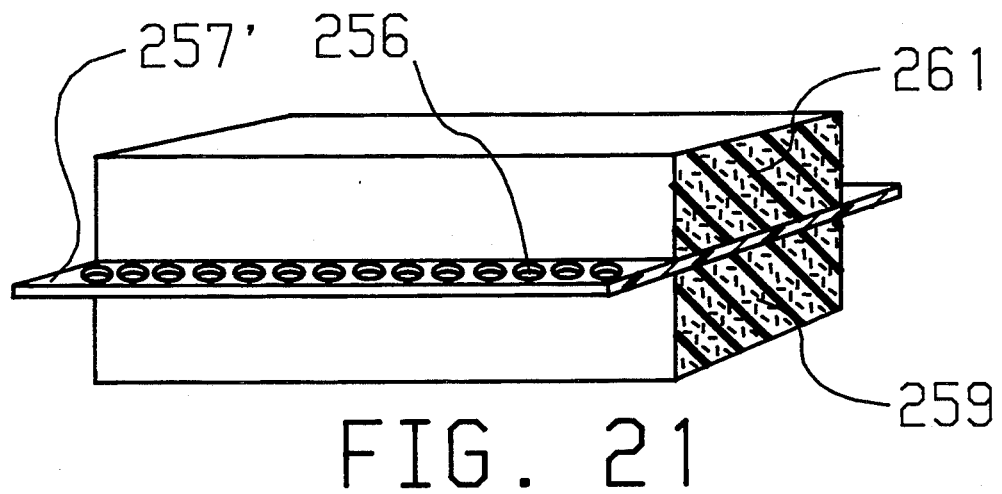
FIG. 21 is a perspective detail view of a composite band formed from a flexible, non-stretchable band having both face laminated to bands formed from compressible material and provided with laterally outwardly offset sprocket holes for engagement with a drive sprocket.

If the non-stretchable component of the composite band lay between two layers of compressible material as shown in FIG. 13, it would not be possible to use a sprocket to drive a single band as shown in FIG. 18, because the compressible material would overlie the sprocket holes. However, if the portion of the composite band containing the sprocket holes extended out beyond the edge of the compressible material as shown in FIG. 21, it would be possible to use a sprocket to advance the band in a manner analogous to the use of a sprocket to advance the bands discussed in the preceding paragraph. FIGS. 20 and 21 illustrate alternative composite band constructions in which the non-stretchable band 257 has a width greater than the compressible band 259 such that sprocket hole arrays 254 and 256 extend laterally outwardly of the side edges of the band 259. As shown in FIG. 21, this construction allows the non-stretchable band 257' to be sandwiched between two compressible bands 259 and 261.

By utilizing such laterally outwardly offset sprocket holes as illustrated in FIGS. 20 and 21, the sprocket drive may be employed in conjunction with the dispenser embodiment illustrated in FIG. 4 by placing drive sprockets in contact with one or both bands in multiple locations in engagement with the outermost layer of the bands on any of the three reels. The band may be maintained tightly wound on all of the reels by providing springs to rotationally bias each of the reels.

With any of the sprocket drive arrangements described above, the sprocket may be rotated by a spring in conjunction with a braking mechanism, motor, or hand crank mechanism with clutch and ratchet as described previously with reference to FIGS. 2 through 12 and shown in FIG. 22. FIG. 22 illustrates one example mechanism for advancing the sprocket 262 of the dispenser shown in FIG. 18. In this method of practicing the invention the motion of the take up reel 212 is biased by a spring in a direction designated by arrow A in FIG. 18 and the storage reel 210 is biased by a spring in the direction opposite to arrow B. The spring which biases storage reel 210 is stronger than the spring which biases take up reel 212, such that band 257 is normally biased to remain on the storage reel 210. A handle 272, shown in FIG. 22, is connected to crank arm 263 to rotationally advance an input drive shaft 265. Selective manipulation of a shifting fork 268 allows connection of input shaft 265 by clutch 267 to output shaft 266. Spring biased engagement of a pawl 270 with a ratchet wheel 269 keyed for rotation with output shaft 266 prevents rotation of output shaft 266 in a direction opposite the direction indicated by arrow C. Output shaft 266 is operatively connected to drive sprocket 262. To remove medication units from storage reel 210, handle 272 and crank arm 263 are rotated in the direction indicated by arrow C. If conditions controlling the removal of mediation units have been met, the control mechanism causes shifting fork 268 to engage clutch 267, thus driving output shaft 266 and sprocket 262. Shifting fork 268 may be activated manually or by a variety of mechanisms, for example by a solenoid. When the composite band has advanced a predetermined specific distance, a rotary encoder (not shown) attached to sprocket 262 generates a signal to notify the controller to disengage clutch 267, thus stopping forward motion of sprocket 262. In addition, the ratchet mechanisms 269, 270 substantially prevents any backward motion of the sprocket 262 due to the spring biasing force applied to the storage reel 210. The combination of the spring forces applied to the storage reel 210 and the restraining ratchet mechanism 269, 270 thus effectively fixes the position of the sprocket 262, until control conditions allow removal of the next medication unit.

The aforementioned handle, clutch, and ratchet arrangement may also be used with a sensor, such as a photocell, for detecting removal of medication units such that the clutch is disengaged after detection of removal of a designated number of medication units, so that no more than the proper number of medication units may be removed.

As an alternative to a restorative spring in conjunction with a ratchet mechanism to maintain storage reel position, a frictional retaining arrangement may be employed. For example, friction between the storage reel and the walls of the dispenser may be used to restrain the motion of the storage reel, instead of a spring. In this case, handle 272, crank arm 263, and clutch 267 may still be employed to selectively move the band towards the take up reel 212, but no ratchet mechanism would be needed to prevent return of the band to the storage reel 210.

While the dispenser has been illustrated and described in the context of the intended primary use to dispense medication units, it is contemplated that the dispenser according to the present invention may also be advantageously employed to dispense various other diverse objects, without departing from the intended scope and content of the invention.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A dispenser for dispensing objects, comprising:
   a storage reel mounted for rotation;
   at least one band at least partially wrapped around said storage reel for holding objects to be dispensed in frictional engagement between adjacent layers of said at least one band; and
   means for maintaining sufficient tension on said at least one band to keep adjacent layers of said at least one band in contact with each other on said storage reel except in regions separated by objects to be dispensed and for holding said objects in place between said layers of said at least one band by frictional engagement; and
   release means for unwinding said at least one band from said storage reel and separating two layers of said at least one band to dispense objects disposed between said layers.

2. The dispenser of claim 1, further comprising means for maintaining tension on said at least one band to keep the layers of said at least one band in contact with each other on said storage reel.

3. The dispenser of claim 2, wherein said means for maintaining tension on said at least one band includes means for exerting a tension force away from said storage reel on said at least one band.

4. The dispenser of claim 2 wherein said release means comprises a moving means which interacts with a portion of said at least one band between two opposite ends of said at least one band to move said at least one band.

5. The dispenser of claim 4 in which said moving means comprises a sprocket which interacts with sprocket holes on said at least one band.

6. The dispenser of claim 5 wherein further comprising a motor for turning said sprocket.

7. The dispenser of claim 5 further comprising a hand crank for turning said sprocket.

8. The dispenser of claim 7 further comprising a ratchet for ensuring that said sprocket is rotated in only one direction.

9. The dispenser of claim 7 further comprising a clutch for selectively controlling the application of rotational force from said hand crank to said sprocket.

10. The dispenser of claim 2 wherein said means for maintaining tension on said at least one band includes a means for restraining the motion of said storage reel.

11. The dispenser of claim 10 wherein said means for restraining the motion of said storage reel comprises a friction creating means.

12. The dispenser of claim 10, wherein said means for restraining the motion of said storage reel comprises a brake.

13. The dispenser of claim 12, further comprising control means for selectively actuating and deactivating said brake.

14. The dispenser of claim 10 wherein said means for restraining the motion of said storage reel comprises a spring.

15. The dispenser of claim 1, wherein at least one surface of said at least one band comprises a high friction material for holding objects substantially in place between the layers of said at least one band on said storage reel.

16. The dispenser of claim 1, wherein at least one surface of said at least one band comprises a compressible material.

17. The dispenser of claim 16, wherein said compressible material comprises elastomer foam.

18. The dispenser of claim 16, wherein said compressible material comprises cloth.

19. The dispenser of claim 16, wherein said compressible material comprises a brush surface formed by a plurality of bristles.

20. The dispenser of claim 1, wherein said release means for unwinding and separating said two layers of said at least one band comprises a take-up means operatively associated with said at least one band for unwinding said at least one band from said storage reel and separating said two layers.

21. The dispenser of claim 1, wherein said release means for unwinding and separating said at least one band comprises at least one take-up reel operatively associated with said at least one band for winding said at least one band from said storage reel onto said at least one take-up reel.

22. The dispenser of claim 21, further comprising means for applying a rotational force to said at least one reel.

23. The dispenser of claim 22, wherein said means for applying a rotational force comprises a motor.

24. The dispenser of claim 22, wherein said means for applying a rotational force comprises a spring.

25. The dispenser of claim 22 wherein said means for applying a rotational force comprises a hand crank.

26. The dispenser of claim 25 further comprising a ratchet for ensuring that said rotational force is applied in only one direction.

27. The dispenser of claim 25 further comprising a clutch for selectively controlling the application of said rotational force from said hand crank to said at least one take up reel.

28. The dispenser of claim 1 further comprising means for advancing said at least one band in uniform distance increments.

29. The dispenser of claim 28 further comprising means for determining when said band has advanced a specific distance.

30. The dispenser of claim 28 further comprising control means responsive to movement of said band a specific distance for selectively controlling the dispensing of objects.

31. The dispenser of claim 28 in which said means for advancing said at least one band in uniform distance increments comprises a moving means which interacts with a portion of said at least one band between two opposite ends of said at least one band.

32. The dispenser of claim 28 wherein said objects to be dispensed are spaced along said at least one band such that said means for advancing said at least one band in uniform distance increments dispenses a uniform number of objects each time said at least one band is advanced.

33. The dispenser of claim 32 where said uniform number of objects is one object.

34. The dispenser of claim 28, wherein said at least one band comprises two bands formed by opposite end portions of a single, overfolded, elongated strip.

35. The dispenser of claim 34, further comprising means for securing said elongated strip to said storage reel adjacent a juncture of said bands at a transverse fold line of said elongated strip.

36. The dispenser of claim 1, further comprising detecting means for detecting dispensed objects released from between the layers of said at least one band.

37. The dispenser of claim 36, further comprising control means responsive to said detecting means for selectively controlling dispensing of objects.

38. The dispenser of claim 36, wherein said detecting means comprises a light source for producing a light beam and a sensor for detecting said light beam and interruptions of said light beam by the passage of objects therethrough.

39. The dispenser of claim 1 wherein said means for unwinding and separating said at least one band from said storage reel creates a separation zone between the layer which is unwinding from said storage reel and the next layer of said band on said storage reel for releasing objects from between said layers of said at least one band in said separation zone and for allowing insertion of said objects between said layers at said separation zone to fill said dispenser.

40. The dispenser of claim 1, wherein facing surfaces of said layers comprise a high friction material for holding objects substantially in place between said layers.

41. The dispenser of claim 1, wherein facing surfaces of said layers comprise a compressible material.

42. The dispenser of claim 41, wherein said compressible material comprises elastomer foam.

43. The dispenser of claim 41, wherein said compressible material comprises cloth.

44. The dispenser of claim 41, wherein said compressible material comprises a brush surface formed by a plurality of bristles.

45. The dispenser of claim 1, further comprising at least one wall surface disposed adjacent at least one side face of said storage reel for substantially preventing objects from moving out from between said layers of said at least one band wrapped on said storage reel.

46. The dispenser of claim 1, further comprising a pair of wall surfaces disposed adjacent opposite side faces of said storage reel for substantially preventing objects from moving out from between said layers of said at least one band wrapped on said storage reel.

47. The dispenser of claim 1, wherein said storage reel is substantially circular.

48. The dispenser of claim 1, further comprising means for rotating said storage reel to wrap said at least one band thereon.

49. The dispenser of claim 48, wherein said means for rotating said storage reel comprises a handle operably attachable to said storage reel.

50. The dispenser of claim 1 wherein said at least one band comprises two bands.

51. The dispenser of claim 50, further comprising means for detecting removal of objects from between said bands.

52. The dispenser of claim 50 wherein said release means for unwinding and separating said bands comprises a pair of separate take-up means operatively associated with said bands for unwinding said bands from said storage reel and separating said bands.

53. The dispenser of claim 52 wherein said release means comprises a moving means which interacts with a portion of at least one of said bands between two opposite ends of said at least one band for moving said at least one band.

54. The dispenser of claim 53 wherein said moving means which interacts with a portion of said at least one band between two opposite ends of said at least one band comprises a sprocket which interacts with sprocket holes in said at least one band.

55. The dispenser of claim 54 further comprising a motor for turning said sprocket.

56. The dispenser of claim 54 further comprising a hand crank for turning said sprocket.

57. The dispenser of claim 56 further comprising a ratchet for ensuring that said sprocket is rotated in only one direction.

58. The dispenser of claim 56 further comprising a clutch for selectively controlling the application of rotational force from said hand crank to said sprocket.

59. The dispenser of claim 52 wherein said release means for unwinding and separating said bands from said storage reel includes means for separating said bands at a predetermined separation zone for releasing objects from between said bands in said separation zone and for allowing insertion of said objects between said bands at said separation zone to fill said dispenser.

60. The dispenser of claim 59 further comprising detecting means and means for positioning said separation zone relative to said detecting means such that objects released at said separation zone are detected by said detecting means.

61. The dispenser of claim 60 wherein said means for positioning said separation zone comprises means for adjusting the spacing of said take-up reels dependent upon the number of wraps of said bands on said take-up reels.

62. The dispenser of claim 60, further comprising control means responsive to said detecting means for selectively controlling dispensing of objects.

63. The dispenser of claim 62, wherein said control means includes means for controlling the dispensing of objects in accordance with at least one programmable time parameter.

64. The dispenser of claim 62, wherein said control means includes means for controlling the dispensing of objects in accordance with at least one programmable quantity parameter.

65. The dispenser of claim 62, wherein said control means includes means for controlling the dispensing of objects in accordance with at least one programmable time parameter and at least one programmable quantity parameter.

66. The dispenser of claim 62, further comprising a communication means operably associated with said control means for allowing remote regulation of the dispensing of objects.

67. The dispenser of claim 50, wherein said release means for unwinding and separating said bands comprises a pair of spaced take-up reels operatively associated with said bands for separately winding said bands from said storage reel onto said take-up reels.

68. The dispenser of claim 67, further comprising means for applying a rotational force to each of said take-up reels.

69. The dispenser of claim 68, wherein said means for applying a rotational force comprises a spring.

70. The dispenser of claim 68, wherein said means for applying a rotational force comprises a motor.

71. The dispenser of claim 67, further comprising means for applying a rotational force to at least one of said take-up reels.

72. The dispenser of claim 71, wherein said means for applying a rotational force comprises a spring.

73. The dispenser of claim 71, wherein said means for applying a rotational force comprises a motor.

74. The dispenser of claim 71 wherein said means for applying a rotational force comprises a hand crank.

75. The dispenser of claim 74 further comprising a ratchet for ensuring that said at least one take up reel is rotated in only one direction.

76. The dispenser of claim 74 further comprising a clutch for selectively controlling the application of said rotational force.

77. The dispenser of claim 1, further comprising a plurality of overlying band layers on said storage reel formed by wrapping said at least one band around said storage reel, said band layers possessing progressively increasing radial distances from the center of said storage reel.

78. The dispenser of claim 1, further comprising control means for selectively controlling the dispensing of objects.

79. The dispenser of claim 78, wherein said objects comprise medication units and said control means includes means for dispensing said medication units in accordance with a predetermined medication regimen.

80. The dispenser of claim 79, wherein said control means includes means for allowing modification of said medication regimen.

81. The dispenser of claim 78, wherein said control means includes means for controlling the dispensing of objects in accordance with at least one programmable time parameter.

82. The dispenser of claim 78, wherein said control means includes means for controlling the dispensing of objects in accordance with at least one programmable quantity parameter.

83. The dispenser of claim 78, wherein said control means includes means for controlling the dispensing of objects in accordance with at least one programmable time parameter and at least one programmable quantity parameter.

84. The dispenser of claim 78, further comprising a communication means operably associated with said control means for allowing remote regulation of the dispensing of objects.

85. The dispenser of claim 1, further comprising:
a plurality of sets of storage reels and associated release means; and
control means for selectively controlling the dispensing of objects from storage reels in each of said plurality of sets.

86. The dispenser of claim 85, wherein each of said plurality of sets of storage reels and associated release means comprise separate, selectively removable cartridges.

87. The dispenser of claim 85, wherein said objects comprise medication units and said control means includes means for dispensing said medication units in accordance with a predetermined medication regimen.

88. The dispenser of claim 87, wherein said control means includes means for allowing modification of said medication regimen.

89. The dispenser of claim 1, further comprising a substantially moisture-proof container at least substantially enclosing said storage reel and said at least one band.

90. The dispenser of claim 89, further comprising an opening in said container for allowing removal of dispensed objects, said container possessing a substantially moisture-proof selectively openable cover.

91. The dispenser of claim 1, wherein said objects comprise medication units.

92. The dispenser of claim 91, wherein said objects are selected from the group consisting of pills, tablets, caplets, and capsules.

93. A dispenser for dispensing objects, comprising:
a storage reel mounted for rotation;
at least one band at least partially wrapped around said storage reel for holding objects to be dispensed in frictional engagement between adjacent layers of said at least one band;
said at least one band including at least one surface comprising a compressible material disposed for contact with objects to be dispensed;
at least one take-up reel operatively associated with said at least one band for unwinding said at least one band away from said storage reel and separating adjacent layers of said at least one band for releasing objects disposed between said layers;
means for applying a rotational force to said at least one take-up reel for maintaining sufficient tension on said at least one band to keep layers of said at least one band in contact with each other on said storage reel except in regions separated by objects to be dispensed so as to hold objects substantially in place between adjacent layers of said at least one band solely by frictional engagement; and
means for selectively preventing and allowing rotation of said storage reel for unwinding said at least one band from said storage reel and separating two adjacent layers of said at least one band to dispense objects in a controlled manner.

94. A dispenser for dispensing objects, comprising:
a storage reel mounted for rotation;
at least one band at least partially wrapped around said storage reel for holding objects to be dispensed in frictional engagement between adjacent layers of said at least one band; and
release means for unwinding said at least one band from said storage reel and separating two adjacent layers of said at least one band to dispense objects disposed between said layers;
said means for unwinding and separating said adjacent layers of at least one band from said storage reel creating a separation zone between the layer which is unwinding from said storage reel and the next layer of said band on said storage reel for releasing objects from between said layers of said at least one band in said separation zone and for allowing insertion of said objects between said layers at said separation zone to fill said dispenser; and
detecting means and positioning means for positioning said separation zone relative to said detecting means such that objects released at said separation zone are detected by said detecting means.

95. A dispenser for dispensing objects, comprising:
a storage reel mounted for rotation;
at least one band at least partially wrapped around said storage reel for holding objects to be dispensed in frictional engagement between adjacent layers of said at least one band;
at least one facing surface of said at least one band comprising a material having a coefficient of friction sufficient to inhibit motion of objects to be dispensed when tension on said band keeps said surface in contact with the surface of an adjacent layer of said band on said storage reel;
means for maintaining sufficient tension on said at least one band to keep adjacent layers of said at least one band in contact with each other on said storage reel except in regions separated by objects to be dispensed so as to hold said objects in place between said layers of said at least one band solely by frictional engagement; and release means for unwinding said at least one band from said storage reel and separating two adjacent layers of said at least one band to dispense objects disposed between said layers.

* * * * *